(12) United States Patent
Logan et al.

(10) Patent No.: US 9,619,453 B2
(45) Date of Patent: *Apr. 11, 2017

(54) MODEL-DRIVEN LIST PICKER

(71) Applicant: Oracle International Corporation, Redwood Shores, CA (US)

(72) Inventors: Shaun Logan, Melrose, MA (US); Edmund Alexander Davis, San Mateo, CA (US); Brian Rowles, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/333,205

(22) Filed: Jul. 16, 2014

(65) Prior Publication Data

US 2015/0089351 A1    Mar. 26, 2015

Related U.S. Application Data

(60) Provisional application No. 61/880,756, filed on Sep. 20, 2013, provisional application No. 61/880,762, filed on Sep. 20, 2013, provisional application No. 61/880,769, filed on Sep. 20, 2013, provisional application No. 61/880,764, filed on Sep. 20, 2013, provisional application No. 61/908,904, filed on Nov.

(Continued)

(51) Int. Cl.
*G06F 17/00*    (2006.01)
*G06F 17/24*    (2006.01)
*G06F 3/0484*    (2013.01)
*G06F 17/22*    (2006.01)
*G06F 3/0481*    (2013.01)
*G06F 17/30*    (2006.01)

(52) U.S. Cl.
CPC .......... *G06F 17/246* (2013.01); *G06F 3/0484* (2013.01); *G06F 3/04817* (2013.01); *G06F 17/2247* (2013.01); *G06F 17/30424* (2013.01)

(58) Field of Classification Search
CPC .................................................... G06F 17/248
See application file for complete search history.

(56) References Cited

U.S. PATENT DOCUMENTS 6,266,058 B1    7/2001   Meyer
7,546,602 B2    6/2009   Hejlsberg et al.
(Continued)

OTHER PUBLICATIONS

Non Final Office Action mailed Mar. 17, 2016, in U.S. Appl. No. 14/333,238, 14 pages.

(Continued)

*Primary Examiner* — Andrew McIntosh
(74) *Attorney, Agent, or Firm* — Kilpatrick Townsend & Stockton LLP

(57) ABSTRACT

In various embodiments, methods, systems, and non-transitory computer-readable media are disclosed that allow developers to place popup or list pickers as components of a document using a desktop integration framework. The popup or list pickers can be tied to model metadata allowing a pick list to be dynamically generated when the document is rendered. This allows workbook developers to leverage existing Model layer metadata combined with simple workbook configuration to easily create powerful Search and Select user interfaces for choosing values for ADF Table cells.

13 Claims, 25 Drawing Sheets

Related U.S. Application Data 26, 2013, provisional application No. 61/908,897, filed on Nov. 26, 2013.

(56) References Cited

U.S. PATENT DOCUMENTS

| | | | |
|---|---|---|---|
| 7,917,888 B2 | 3/2011 | Chong | |
| 8,417,728 B1* | 4/2013 | Anders | G06F 8/34 707/793 |
| 9,524,287 B2 | 12/2016 | Davis et al. | |
| 2004/0046789 A1 | 3/2004 | Inanoria | |
| 2005/0183059 A1* | 8/2005 | Loksh | G06F 8/24 717/101 |
| 2007/0219956 A1 | 9/2007 | Milton | |
| 2008/0222238 A1* | 9/2008 | Ivanov | H04L 67/16 709/202 |
| 2008/0256554 A1 | 10/2008 | Yassin | |
| 2009/0064001 A1 | 3/2009 | Robbins | |
| 2009/0183072 A1 | 7/2009 | Stephenson et al. | |
| 2011/0107196 A1 | 5/2011 | Foster | |
| 2012/0036125 A1 | 2/2012 | Al-Kofahi et al. | |
| 2014/0281943 A1 | 9/2014 | Prilepov et al. | |
| 2015/0089340 A1 | 3/2015 | Logan et al. | |
| 2015/0089341 A1 | 3/2015 | Davis et al. | |
| 2015/0089342 A1 | 3/2015 | Davis et al. | |
| 2015/0089350 A1 | 3/2015 | Davis et al. | |
| 2016/0004668 A1 | 1/2016 | Rowles et al. | |
| 2016/0085735 A1 | 3/2016 | Davis et al. | |

OTHER PUBLICATIONS

Non Final Office Action mailed Dec. 21, 2015, in U.S. Appl. No. 14/333,176, 16 pages.

Grossman et al., ToolClips: An Investigation of Contextual Video Assistance for Functionality Understanding, CHI 2010: Looking with Video, Apr. 10-15, 2010, pp. 1515-1524.

U.S. Appl. No. 14/333,105, Non-Final Office Action mailed on Jun. 30, 2016, 22 pages.

U.S. Appl. No. 14/333,146, Non-Final Office Action mailed on Oct. 19, 2016, 26 pages.

U.S. Appl. No. 14/333,176, Advisory Action mailed on Oct. 18, 2016, 3 pages.

U.S. Appl. No. 14/333,176, Final Office Action mailed on Jul. 8, 2016, 18 pages.

U.S. Appl. No. 14/333,238, Notice of Allowance mailed on Aug. 16, 2016, 11 pages.

U.S. Appl. No. 14/333,176, Notice of Allowance mailed on Dec. 2, 2016, 11 pages.

U.S. Appl. No. 14/333,105, Final Office Action mailed on Jan. 25, 2017, 28 pages.

* cited by examiner

| Property | Category | Type | Description |
|---|---|---|---|
| EnableInputListOfValues | Behavior | boolean | Indicates whether Input List of Values behavior is supported in ModelDrivenColumnComponents. |

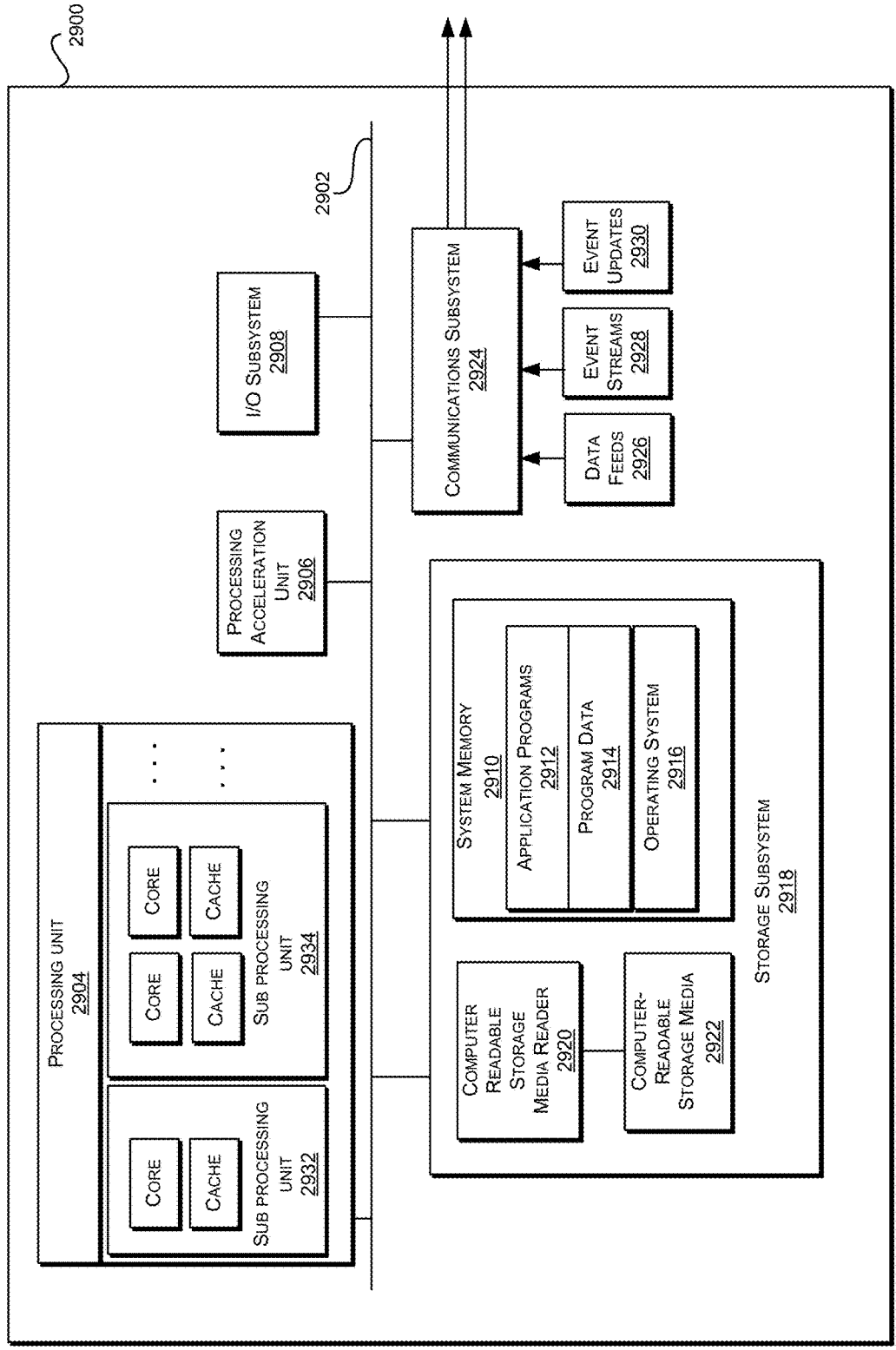

MODEL-DRIVEN LIST PICKER

CROSS-REFERENCES TO RELATED APPLICATIONS

This application claims the benefit of and priority to:
U.S. Provisional Application No. 61/880,756, filed Sep. 20, 2013, and entitled "MODEL-DRIVEN TOOL TIPS IN EXCEL,"
U.S. Provisional Application No. 61/880,762, filed Sep. 20, 2013, and entitled "AUTOMATIC COLUMN RESIZING,"
U.S. Provisional Application No. 61/880,769, filed Sep. 20, 2013, and entitled "IMAGE COMPONENT,"
U.S. Provisional Application No. 61/880,764, filed Sep. 20, 2013, and entitled "PROMPT FOR WORKBOOK PARAMS,"
U.S. Provisional Application No. 61/908,904, filed Nov. 26, 2013, and entitled "DATE PICKER IN EXCEL," and
U.S. Provisional Application No. 61/908,897, filed Nov. 26, 2013, and entitled "MODEL-DRIVEN LIST PICKER," the disclosures of which are incorporated by reference herein for all purposes.

This Application is further related to the following commonly-owned co-pending Applications:
U.S. patent application Ser. No. 14/333,105, filed Jul. 16, 2014, and entitled "MODEL-DRIVEN DESKTOP INTEGRATION FRAMEWORK"
U.S. patent application Ser. No. 14/333,146, filed Jul. 16, 2014, and entitled "AUTOMATIC COLUMN RESIZING"
U.S. patent application Ser. No. 14/333,238, filed Jul. 16, 2014, and entitled, and entitled "MODEL-DRIVEN TOOLTIPS IN EXCEL" and
U.S. patent application Ser. No. 14/333,176, filed Jul. 16, 2014, and entitled "DATE PICKER IN EXCEL".

BACKGROUND OF THE INVENTION

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Accordingly, what is desired is to solve problems relating to building application user interfaces using application development frameworks, some of which may be discussed herein. Additionally, what is desired is to reduce drawbacks relating to building user interfaces using application development frameworks, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, methods, systems, and non-transitory computer-readable media are disclosed that allow developers working within desktop applications to create application-specific documents that integrate with web-based applications. Using a desktop integration framework, a developer can design documents having components that provide user interfaces to data associated with data models of the web-based applications. In one aspect, how a component looks and is configured can be dynamically driven at runtime based on aspects of its underlying data model.

In various embodiments, methods, systems, and non-transitory computer-readable media are disclosed that allow developers to place popup or list pickers as components of a document using a desktop integration framework. The popup or list pickers can be tied to model metadata allowing a pick list to be dynamically generated when the document is rendered. This allows workbook developers to leverage existing Model layer metadata combined with simple workbook configuration to easily create powerful Search and Select user interfaces for choosing values for ADF Table cells.

In one embodiment, a method for creating documents of desktop applications that act as user interfaces for web-based applications includes creating contents of a document in a native application format associated with a first application. A user interface element is associated with a portion of the contents of the document. The user interface element is a component of a second application and provides a link between the portion of the contents of the document and data associated with data models provided by web-based applications in communication with the second application. The user interface element is mapped to one or more data models provided by a web-based application wherein the user interface element contributes at least a portion of data associated with the one or more data models provided by the web-based application to a user interface within the first application and wherein how the user interface element contributes a list picker to the user interface is driven at runtime based on the one or more data models. Metadata associated with the document is generated based on the associating of the user interface element with the portion of the contents of the document and the mapping of the user interface element to the one or more data models provided by the web-based application.

In one aspect, mapping the user interface element to the one or more data models provided by the web-based application includes configuring the user interface element to provide a list picker based on a type of the data determined at runtime. Mapping the user interface element to the one or more data models provided by the web-based application may include configuring the user interface element with specific functionality allowing the user to interact with the data based on one or more aspects of the data determined at runtime. Mapping the user interface element to the one or more data models provided by the web-based application may include configuring the user interface element to provide a list of values derived from an entity modeled by the one or more data models at runtime. Mapping the user interface element to the one or more data models provided by the web-based application may include configuring the user interface element to provide a search interface enabling a user to search within a list of values derived from an entity modeled by the one or more data models at runtime.

In some embodiments, associating the user interface element with the portion of the contents of the document includes associating a text box, label, button, list, table, radio button, checkbox, input widget, or output widget. Creating the contents of the document in the native application format associated with the first application may include creating a spreadsheet using a spreadsheet desktop application. Creating the contents of the document in the native application format associated with the first application may include creating a word processing document using a desktop publishing application.

In various embodiments, the document and the metadata associated with the document are published to the web-based application such that the document becomes usable as a user interface to the web-based application. The document is then retrieved from the web-based application. The retrieved document is rendered based on the document and the metadata associated with the document at runtime to determine how the user interface element contributes to the user interface. Rendering the document may include generating functionality that displays an interface in response to a user interaction that allows a user to select one or more values determined at runtime and that inputs a selection into the contents of the document.

In one embodiment, a modification to the document is received in the portion of data contributed by the user interface element. The web-based application is then updated using the second application to reflect the modification.

In one embodiment, a non-transitory computer-readable medium stores code that when executed by one or more processors associated with one or more computer systems configures the one or more processors for creating documents of desktop applications that act as user interfaces for web-based applications. The non-transitory computer-readable medium includes code for creating, by a computer system, contents of a document in a native application format associated with a first application, code for associating, by a computer system, a user interface element with a portion of the contents of the document, the user interface element being a component of a second application and providing a link between the portion of the contents of the document and data associated with data models provided by web-based applications in communication with the second application, code for mapping, by a computer system, the user interface element to one or more data models provided by a web-based application wherein the user interface element contributes at least a portion of data associated with the one or more data models provided by the web-based application to a user interface within the first application and wherein how the user interface element contributes a list picker to the user interface is driven at runtime based on the one or more data models, and code for generating, by a computer system, metadata associated with the document based on the associating of the user interface element with the portion of the contents of the document and the mapping of the user interface element to the one or more data models provided by the web-based application.

In one embodiment, a system includes a processor and a memory storing a set of instructions which when executed by the processor configure the processor to create contents of a document in a native application format associated with a first application, associate a user interface element with a portion of the contents of the document, the user interface element being a component of a second application and providing a link between the portion of the contents of the document and data associated with data models provided by web-based applications in communication with the second application, map the user interface element to one or more data models provided by a web-based application wherein the user interface element contributes at least a portion of data associated with the one or more data models provided by the web-based application to a user interface within the first application and wherein how the user interface element contributes a list picker to the user interface is driven at runtime based on the one or more data models, and generate metadata associated with the document based on the associating of the user interface element with the portion of the contents of the document and the mapping of the user interface element to the one or more data models provided by the web-based application.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIGS. 11 and 12 are illustrations of screenshots of tool tips defined using the desktop integration framework of FIG. 2 in one embodiment according to the present invention.

FIG. 24 is a screenshot of configuration properties that enable a user to enable a list picker for a document element in one embodiment according to the present invention.

FIG. 29 illustrates an exemplary computer system, in which various embodiments of the present invention may be implemented.

DETAILED DESCRIPTION OF THE INVENTION

Figure 1:
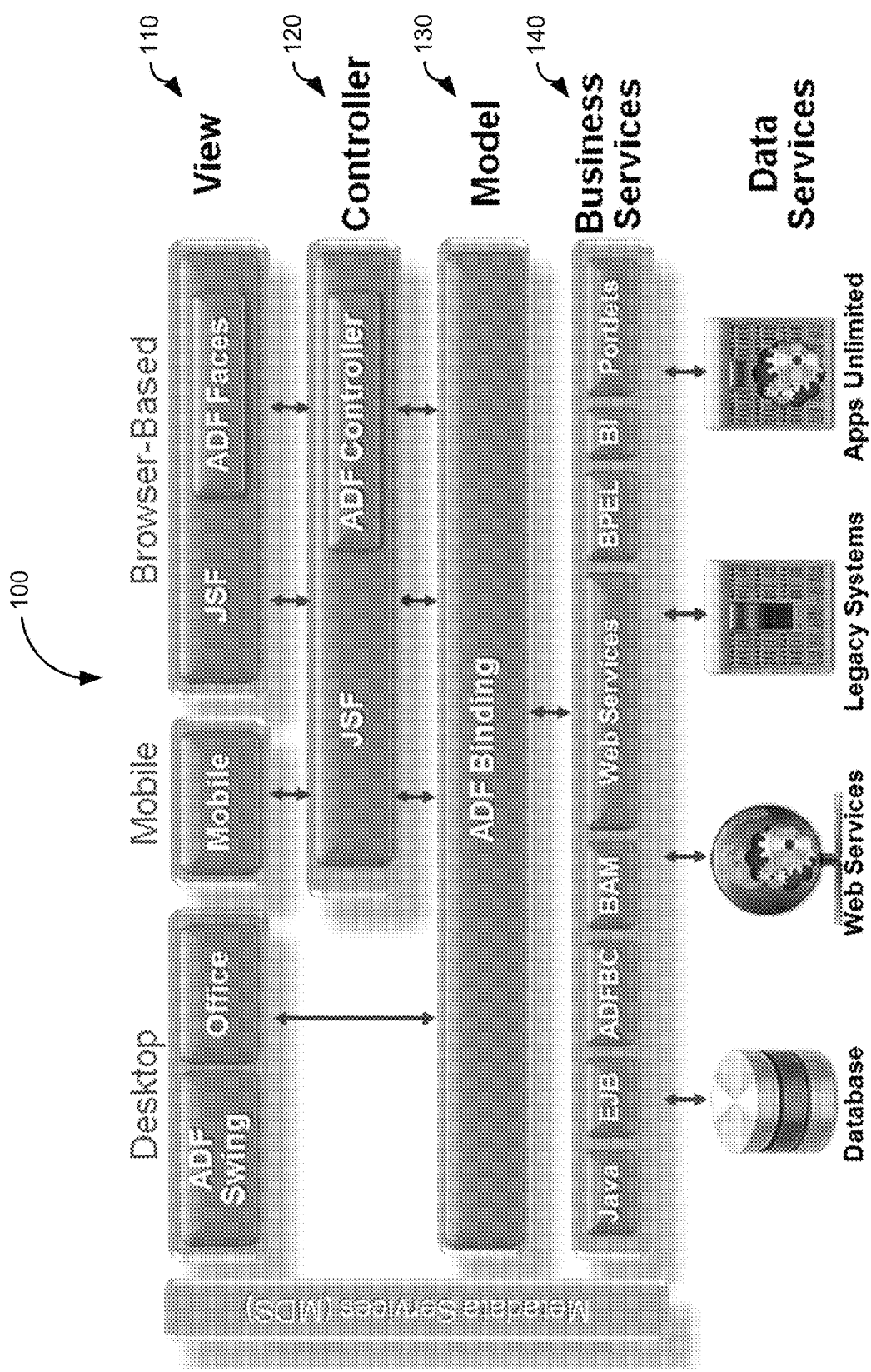
FIG. 1 is a block diagram illustrating an application development framework (ADF) in one embodiment according to the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Introduction

Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of ADFs, such as Oracle ADF, the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle ADF provides the infrastructure code to implement agile SOA based applications thereby removing the effort involved in an organization "rolling their own."

Oracle ADF further provides a visual and declarative approach to Java EE development through the Oracle JDeveloper 11g development tool. Oracle ADF implements the Model-View-Controller design pattern and offers an integrated solution that covers all the layers of this architecture with solution to such areas as Object/Relational mapping, data persistence, reusable controller layer, rich Web user interface framework, data binding to UI, security and customization. Extending beyond the core Web based MVC approach, ADF also integrates with the Oracle SOA and WebCenter Portal frameworks simplifying the creation of complete composite applications.

For example, Oracle ADF makes it easy to develop agile applications that expose data as services by coupling a service interface to the built-in business services in ADF. This separation of business service implementation details is performed in Oracle ADF via metadata. Use of this metadata-driven architecture enables application developers to focus on the business logic and user experience, rather than the details of how services are accessed.

Oracle ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating application development framework (ADF) 100 in one embodiment according to the present invention. FIG. 1 is a simplified illustration of a system that may incorporate various embodiments or implementations of the one or more inventions presented within this disclosure. FIG. 1 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF 100 may be embodied as Oracle ADF is one example. Accordingly, ADF 100 is based on a Model-View-Controller (MVC) design pattern. An MVC application is separated into: 1) a model layer that handles interaction with data-sources and runs the business logic, 12) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In this embodiment, modules forming an enterprise application are shown as being within ADF 100 to represent that the modules are developed using ADF and then executed within the context of ADF 100. For conciseness, the various internal details of ADF are not shown assuming that the application is developed using the JAVA programming language and Oracle ADF available as part of JDeveloper 10.1.3, a development tool available from Oracle Corporation. However, the features of the present invention described below may be implemented using any desired combination of programming language and application development framework as will be apparent to one skilled in the relevant arts by reading the disclosure provided herein.

In various embodiments, ADF 100 an application to be developed in the form of multiple layers, each layer containing code modules/files implementing desired logic according to pre-defined specification. Thus, in one embodiment, ADF 100 enables the application to be developed as four layers: view layer 110 containing code modules/files that provide the user interface of the application, controller layer 120 containing code modules that control the flow of the application, model layer 130 containing data/code modules that provide an abstraction layer for the underlying data, and business services layer 140 containing code modules that provide access to data from various sources and handles business logic.

Oracle ADF lets developers choose the technology they prefer to use when implementing each of the layers. FIG. 1 shows various options available for developers when building Oracle ADF applications. The glue that integrates the various components of Java EE applications and makes development so flexible is the Oracle ADF model layer. EJB, Web Services, JavaBeans, JPA/EclipseLink/TopLink objects, and many others can all be used as Business Services for the Oracle ADF Model. View layers can include Web based interfaces implemented with JSF, Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems.

In one aspect, view layer 110 represents the user interface of the application being developed. View layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle ADF support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

Oracle ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle ADF can be implemented in any of the following options: As simple Java classes, EJB, Web services, JPA objects, and Oracle ADF Business Components. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Desktop Integration

ADF Desktop Integration (ADFdi) extends the Oracle Application Development Framework into the world of desktop applications like Microsoft Excel. Application developers can rapidly develop integrated documents, such as spreadsheets and documents of other desktop-based applications, to allow users to access and edit critical business data. This framework integrates seamlessly with each web application's security and business logic infrastructure. It also allows end users to edit their data without a live connection to the network. Once reconnected, ADF Desktop Integration can transparently upload and validate all user changes against the application's backend. Thus, ADF Desktop Integration allows developers to extend functionality provided by web-based applications to desktop applications. End users may also prefer ADF Desktop Integration because it provides a familiar user interface in the user's preferred desktop application to undertake information management tasks, such as performing complex calculations or uploading a large amount of data, easily and seamlessly.

Figure 2:
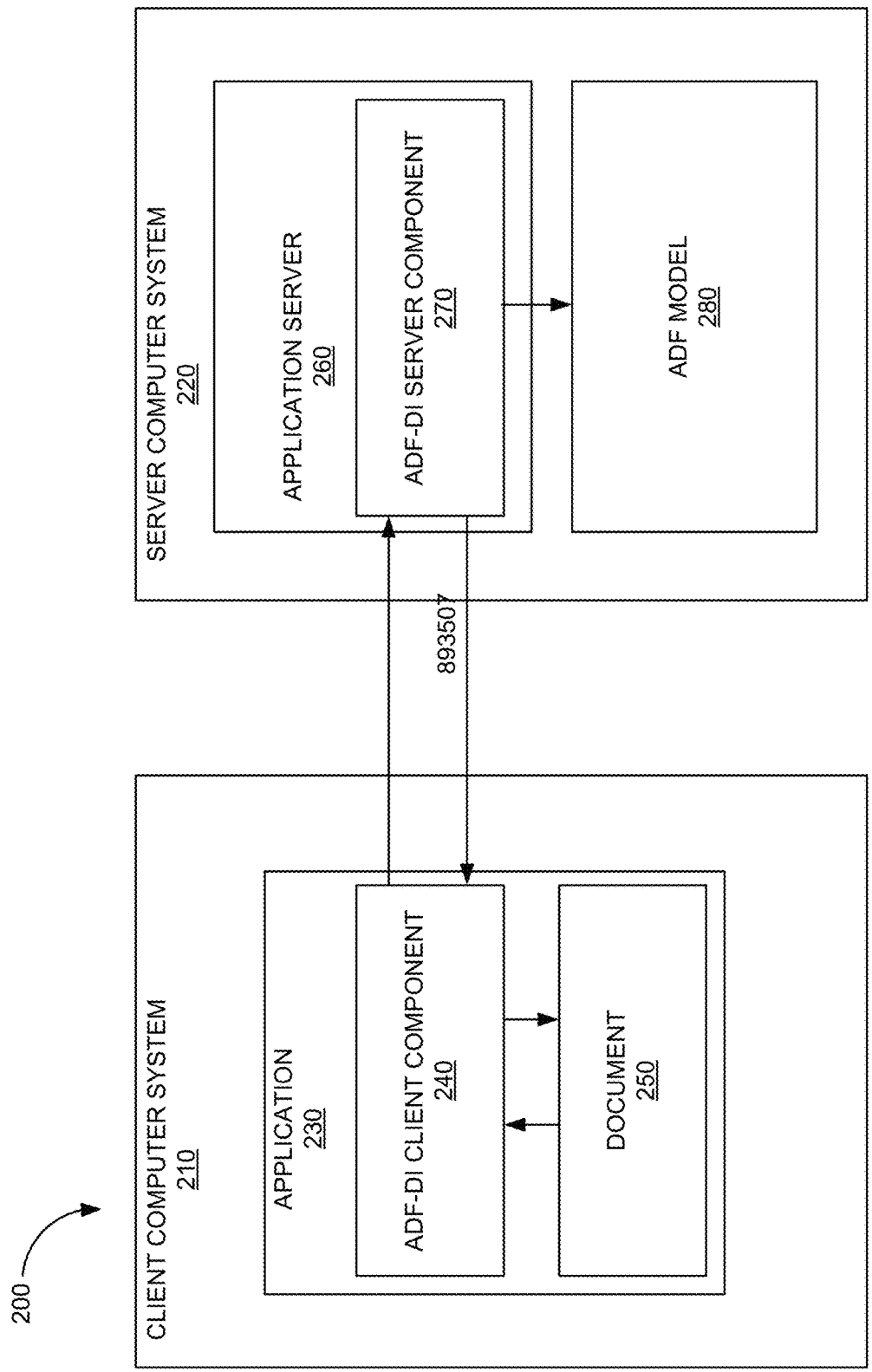
FIG. 2 is a block diagram illustrating a desktop integration framework for ADF of FIG. 1 in one embodiment according to the present invention.

FIG. 2 is a block diagram illustrating desktop integration framework 200 for ADF 100 of FIG. 1 in one embodiment according to the present invention. Desktop integration framework 200 may incorporate various embodiments or implementations of the one or more inventions presented within this disclosure. Desktop integration framework 200 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, desktop integration framework 200 includes client computer system 210 and server computer system 220. Client computer system 210 is representative of hardware and/or software elements configured to provide access to and/or host application 230. Client computer system 210 may be embodied as a personal computer system, a laptop, a tablet, a mobile device, and the like. Client computer system 210 may include one or more operating systems, applications, browsers, and the like executing on one or more computers. Client computer system 210 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application 230 is representative of one or more software elements that allow users to generate, edit, or otherwise interact with documents. Some examples of application 230 are text editors, word processing applications, spreadsheet applications, image editing and manipulation programs, and the like. In various embodiments, desktop integration framework 200 operates with configurations specific to desktop applications, such as Microsoft Office products like Microsoft Word and Microsoft Excel.

Application 230 further includes or is otherwise in communication with ADF-DI client component 240 and creates document 250. ADF-DI client component 240 is representative of one or more software elements that extend the functionality provided by web-based or other network-accessible applications to application 230. For example, ADF-DI client component 240 allows end users to avail themselves of a familiar user interface associated with application 230 to undertake information management tasks using document 250 that are normally performed by accessing server computer system 220. These tasks may be performed by or handled by web-based or other network-accessible applications hosted by server computer system 220. In various embodiments, data manipulated by such information management tasks performed in application 230 is synchronized with server computer system 220.

Document 250 is representative of one or more computer data files or units of electronic information. Document 250 may include text, images, audio, video, and other multimedia information. Document 250 may further be associated with metadata specific to application 230. Document 250 (or application 230) may provide native functionality for creating, interacting, and managing content associated with document 250. In various aspects, application 230 provides one or more interfaces for interacting with functionality of application 230 or content of document 250.

Server computer system 220 is representative of hardware and/or software elements configured to provide access to and/or host application server 260. Server computer system 220 may be embodied as local server computer system, a cloud service, and the like. Server computer system 220 may include one or more operating systems, servers, services, applications, and the like executing on one or more computers. Server computer system 220 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application server 260 is representative of one or more software elements that allow users to interact with web-based or network-based applications. Some examples of application server 260 are either a software framework that provides a generalized approach to creating an application-server implementation, without regard to what the application functions are, or the server portion of a specific implementation instance. In various embodiments, application server 260 operates with configurations specific to Java Platform, Enterprise Edition, or Java EE that defines a core set of API and features of Java Application Servers. Application server 260 may include servlets, and JavaServer Pages, Enterprise JavaBeans, and the like. Application server 260 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF-DI server component 270 is representative of one or more server components, such as part of application server 260. In general, ADF-DI client component 240 acts as both view layer 110 and controller layer 120 and communicates with ADF-DI server component 270 acting in part as model layer 130 to synchronize data and execute business logic in applications hosted by application server 260 or in communication with application server 260 using ADF model 280. As discussed above, model layer 130 represents the data values related to a current view presented by ADF-DI client component 240 within application 230, along with model-level business rules, security, and application logic used against the data values. In this example, ADF-DI client component 240 and ADF-DI server component 270 allows end users to avail themselves of a familiar user interface associated with application 230 to undertake View/Controller tasks using document 250 to access ADF model 280.

In one aspect, a developer utilizes a design mode of ADF-DI client component 240 to work within application 230 to create document 250. The developer can structure and format document 250 in a desired manner utilizing native tools of application 230. The developer can also add components to document 250 using ADF-DI client component 240 to integrate document 250 with application server 260. Some examples of components or (ADFdi components) are input components (e.g., form components), output components, labels, lists, buttons, images, tables, and the like.

In various embodiments, the developer maps components that are added to document 250 to corresponding data or models associated with application server 260. The data or models can be provided by or through ADF-DI server component 270. In various embodiments, each component added to document 250 is mapped to data or an attribute of a data model exposed by model layer 130 to provide an input/output mechanism within document 250. In this example, a text box component can be added to document 250 and mapped to an attribute of ADF model 280 provided by or exposed through ADF-DI server component 270 to ADF-DI client component 240.

In one aspect, a component is a reusable entity, one having functionality that can be used by many applications or that can be used multiple times by the same application. Components can be embedded within document 250. A component generally provides one or more interfaces, such as a programming interface, a data-binding interface, or a visual interface. In one embodiment, a component having no visual representations added to document 250 is rendered or but not otherwise displayed at runtime and can provide some additional functionality. A component may have zero or more visual representations. As described further below, a component can have a visual representation driven by an underlying model.

In one aspect, a component can specify any number of views at design time, any of which can be displayed at runtime. A view assembly is the set of views that are actually displayed at runtime. The view assembly, for an application or a component, consists of views in the view composition that is selected for display at a certain point in time.

Once all desired components are included and mapped to data and/or model metadata accessible to application server 260 and ADF model 280, document 250 can be "published" or otherwise made available on application server 260. Application server 260 may provide a download link to published documents enabling users to access the documents via a browser and begin working within application 230 to view, create, and/or manipulate data, such as that stored in a database accessible to server computer system 220. In various embodiments, published documents are stored separately from the document metadata that defines components, data mappings, and any logic a developer associated with a document. In some embodiments, a published document includes all document metadata.

Figure 3:
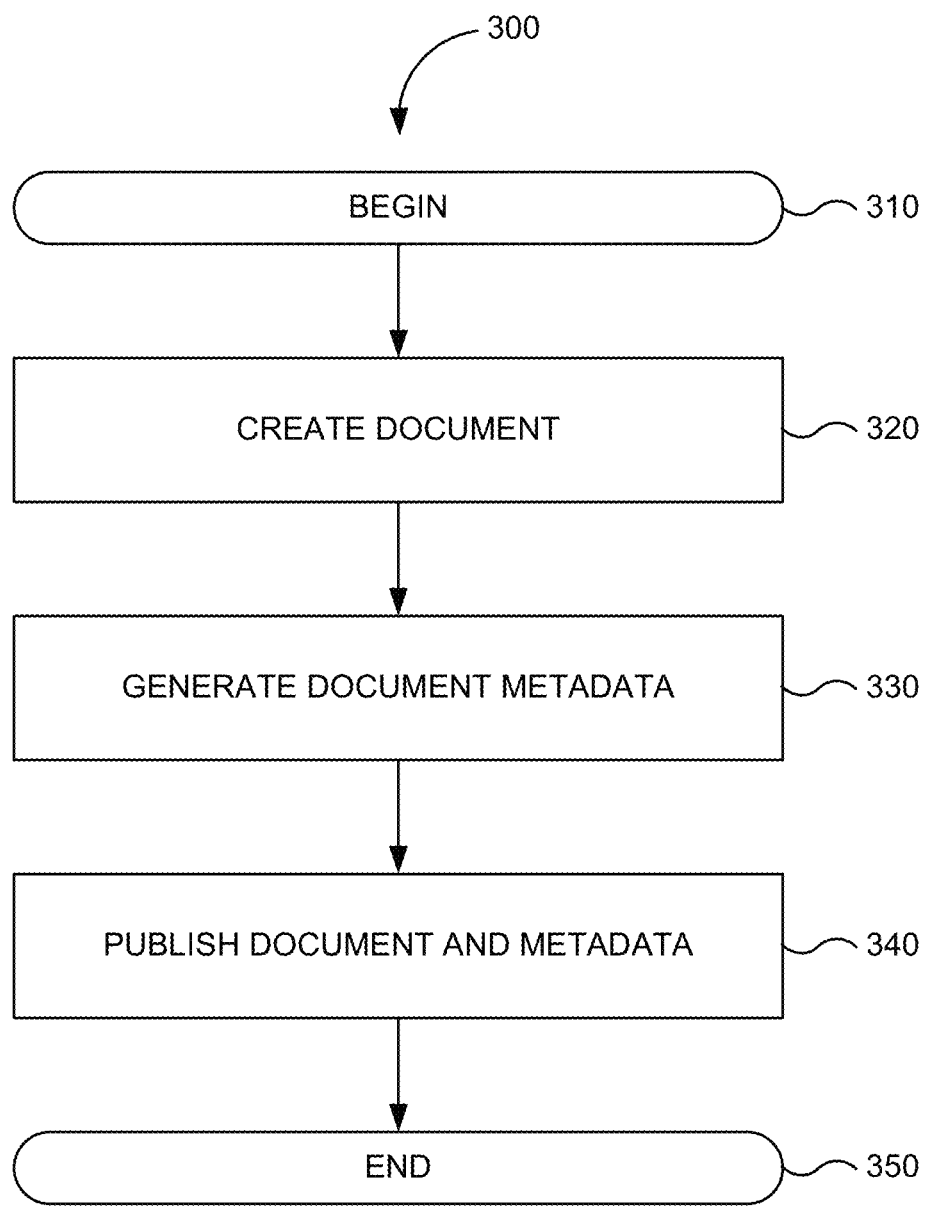
FIG. 3 is a flowchart of a method for designing a document using the desktop integration framework of FIG. 2 in one embodiment according to the present invention.

FIG. 3 is a flowchart of method 300 for designing a document using desktop integration framework 200 of FIG. 2 in one embodiment according to the present invention. Implementations or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a document is created. In various embodiments, documents are created by a user or developer by using an application that natively creates such documents or by using a software library that creates documents in their native format. According to FIG. 2, a user can open an existing document or create a new document in application 230. For example, the user may create a new spreadsheet in Microsoft Excel and populate the spreadsheet with various workbooks, sheets, tables, graphs, or the like. The user may edit, structure, or format the document in any desired manner using native and non-native tools.

In step 330, document metadata is generated. The document metadata includes information utilized by an integration component of an application (e.g., ADF-DI client component 240) to render contents of an associated document. In one aspect, the document metadata identifies each component included in the document. In another aspect, the document metadata identifies how a component is bound to specific data or to attribute metadata of one or more models. The document metadata can further provide access information, static data, other logic or data manipulation information, or references to where such may be obtained.

As discussed above with respect to FIG. 2, a developer can add components to document 250 using ADF-DI client component 240 to integrate document 250 with application server 260. In various embodiments, ADF-DI client component 240 provides an expression builder allowing a developer to specify values for one or more properties of documents or components that may be added to the documents. In one aspect, a property defines an aspect of the behavior of its corresponding component. For example, a property may specify a model or object that is mapped to the component and/or one or more attributes of the model or object corresponding to the component. In another aspect, a property may specify aspects of a document such as table column headers, worksheet ribbon commands, native document functionality, and the like.

In step 340, the document and the document metadata are published. As discussed above, published documents can be stored separately from the document metadata. In various embodiments, the document is uploaded to a web-based application and made available to users of the application. The document metadata can be uploaded to a metadata repository associated with the application. In some embodiments, a published document may include all or part of the document metadata.

In the example of FIG. 2, a published document includes at least enough metadata that enables ADF-DI client component 240 to initialize the document and request additional information from ADF-DI server component 270 to render the contents of document 250 for the user at runtime. FIG. 3 ends in step 350.

During runtime, a user downloads published document 250 and opens it with application 230. In one embodiment, ADF-DI client component 240 has been installed as an application plugin or module. ADF-DI client component 240 can then detect that document 250 has been authored to include framework components. ADF-DI client component 240 contacts ADF-DI server component 270 to request document metadata, actual data, and any logic that needs to be performed to render document 250. For example, ADF-DI client component 240 may first retrieve from or through from ADF-DI server component 270 document metadata defining which components are to be included and where to include them. ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

Accordingly, a user may retrieve a document template and have the document content automatically updated and formatted based on processing performed by ADF-DI client component 240 and data obtained from application server 260. The users can then avail themselves of the familiar user interface associated with application 230 to undertake tasks using document 250.

In various aspect, as the user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280.

Figure 4:
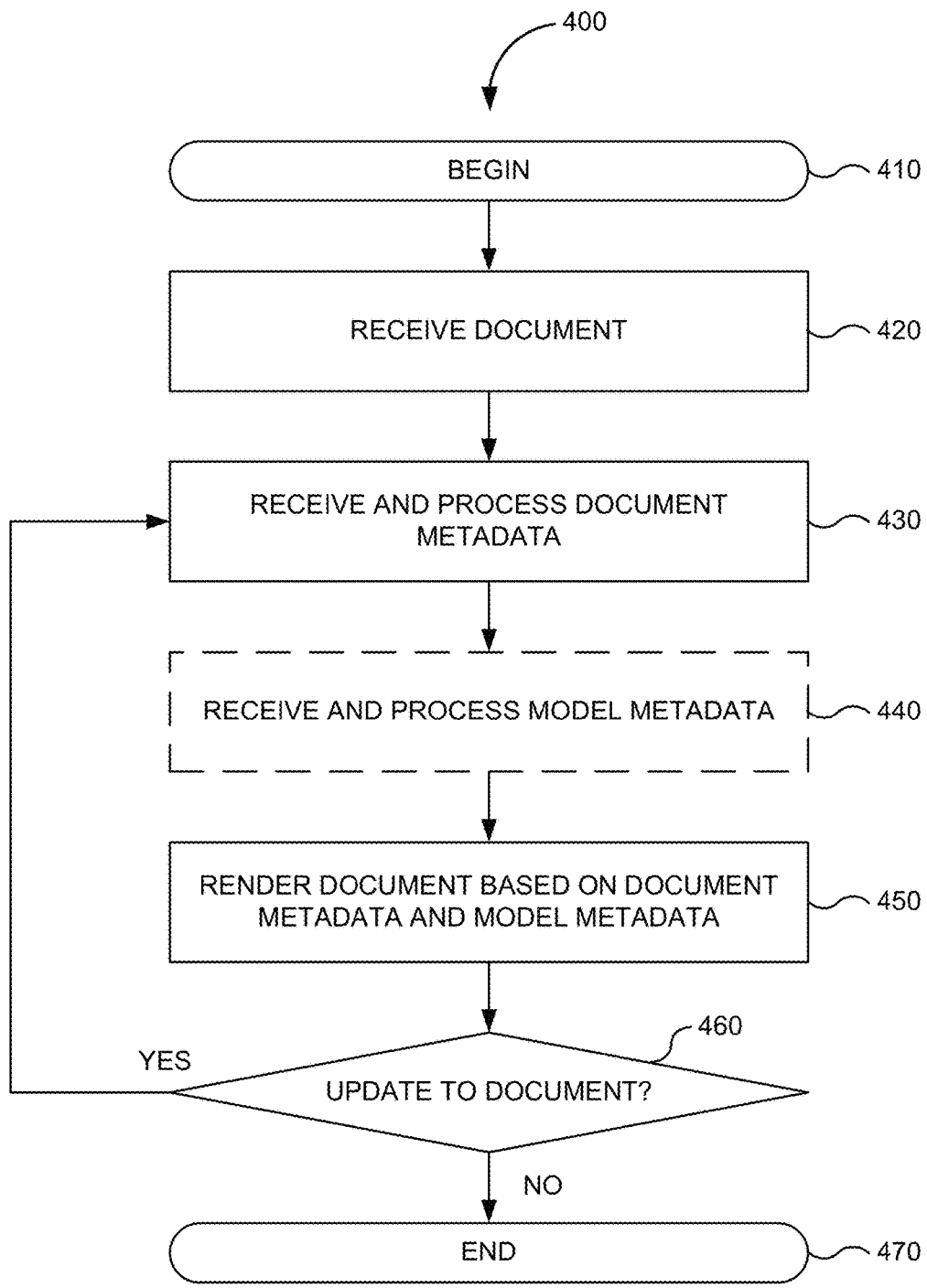
FIG. 4 is a flowchart of a method for interacting with a document using the desktop integration framework of FIG. 2 in one embodiment according to the present invention.

FIG. 4 is a flowchart of method 400 for interacting with a document using desktop integration framework 200 of FIG. 2 in one embodiment according to the present invention. Implementations or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a document is received. As discussed above, documents are published enabling users to access the documents via a browser and begin working within an application (e.g., application 230). In various embodiments, a user selects a document from a web-based application to use as an interface to data provided by the web-based application. The user downloads the document to the user's computer and opens the document using its native application. A plugin of the native application or other software of the client device (e.g., ADF-DI client component 240) detects that the document is an integrated document and begins the rendering process. According to FIG. 2, a user can interact with application server 260 to retrieve a desired document, such as by clicking a document link. The document may be downloaded or otherwise communicated to client computer system 210 and opened in application 230.

In step 430, document metadata is received and processed. In various embodiments, the document metadata is received separately from the document being rendered. For example, an integration component of the native application can detect that a document being opened is an integrated document and begin the rendering process by requesting appropriate document metadata. In some embodiments, all or part of the document metadata is integrated into the document being rendered. The document metadata includes information utilized by the integration component to render contents of the document. Accordingly, based on the document metadata ADF-DI client component 240 can determine which components are to be added to document 250 and where. ADF-DI client component 240 further determines what data or model is used by each component as well as applies any logic defined by a developer.

In optional step 440, model metadata is received and processed. In various embodiments, the model metadata is received separately from the document being rendered and the document metadata. For example, an integration component of the native application can detect during the rendering process that one or more components have properties that are driven by attributes of one or more models. In one aspect, the model metadata identifies how a component is bound to metadata of various models. Accordingly, based on the model metadata ADF-DI client component 240 can update or augment the document metadata associated with document 250. ADF-DI client component 240 further determines what data is referenced by or otherwise used by the metadata of the various associated models.

In step 450, the document is rendered based on the document metadata and the optional model metadata. As discussed above, ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

In step 460, a determination is made whether an update to the document exists. There may be a variety of reasons why an update to the document may exist. As a user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280. In some embodiments, an interaction by a user may require a new dataset. As such, the flow of method 400 returns to step 430 to process any additional document data and optional model metadata. The document can then be rendered (or a portion re-rendered) in step 450. FIG. 4 ends in step 470.

Model-Driven Aspect

In various embodiments, desktop integration framework 200 allows a developer to include components document 250 whose view and data are driven by corresponding models or model attributes. In one aspect, component may be rendered or have their behavior defined dynamically at runtime based on data or logic of corresponding models or model attributes. Data defined via a model or object can automatically configure components of the document when rendered. For example, elements of a list component may be populated with preexisting values associated with one or more attributes of a model or object. Accordingly, a developer is not required to specify the values in each view that a component presents when the document is rendered.

Figure 5:
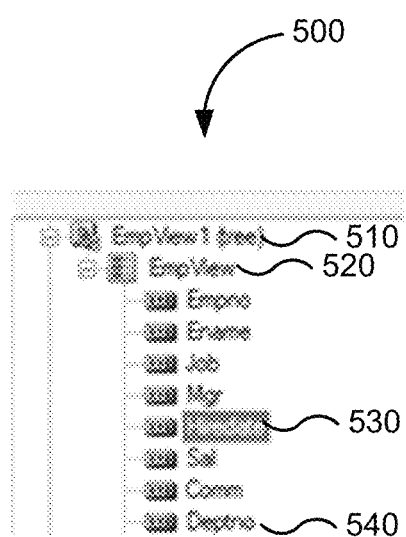
FIG. 5 is an illustration of a screenshot of document components whose views may be driven by underlying data models in one embodiment according to the present invention.

FIG. 5 is an illustration of screenshot 500 of document components whose views may be driven by underlying data models in one embodiment according to the present invention. In this example, tree 510 provides a listing of one or more views that may be presented in document 250. In the example, EmpView 520 includes one or more components, such as text, list, image, date, and the like labeled "Empno", "Ename", "Job", "Mgr", etc.

In one aspect, an underlying data model or attribute of an employee object associated with component 530 is labeled "Hiredate." The data model or attribute is configured to store a date value associated with the date that a given employee was hired by an organization. In various embodiments, the view or behavior of component 530 may be driven by the fact that the attribute stores a date value absent further configuration by a developer. For example, at the time that ADF-DI client component 240 renders an Excel workbook having a cell corresponding to component 530 that stores a value representing the date of the employees hire, the cell is automatically formatted for date information. ADF-DI client component 240 can also configure the cell such that when a user selects the cell, a date popup is provided within or outside of the native features of Excel allowing the user to select a new date of hire or modify an existing date of hire.

In another aspect, an underlying data model or attribute of an employee object associated with component 540 is labeled "Deptno." The data model or attribute is configured to store an identifier for a department or team associated with an employee. In various embodiments, the view or behavior of component 540 may be driven by the fact that the attribute stores one of a plurality of predetermined values specified in the data model absent further configuration by a developer. For example, at the time that ADF-DI client component 240 renders an Excel workbook having a cell corresponding to component 540, ADF-DI client component 240 may configure the cell such that when a user selects the cell that stores a value representing the department or team to which the employee is assigned, a drop down list is provided within or outside of the native features of Excel allowing the user to select from a predetermined list of departments or teams derived from the data model.

Figure 6:
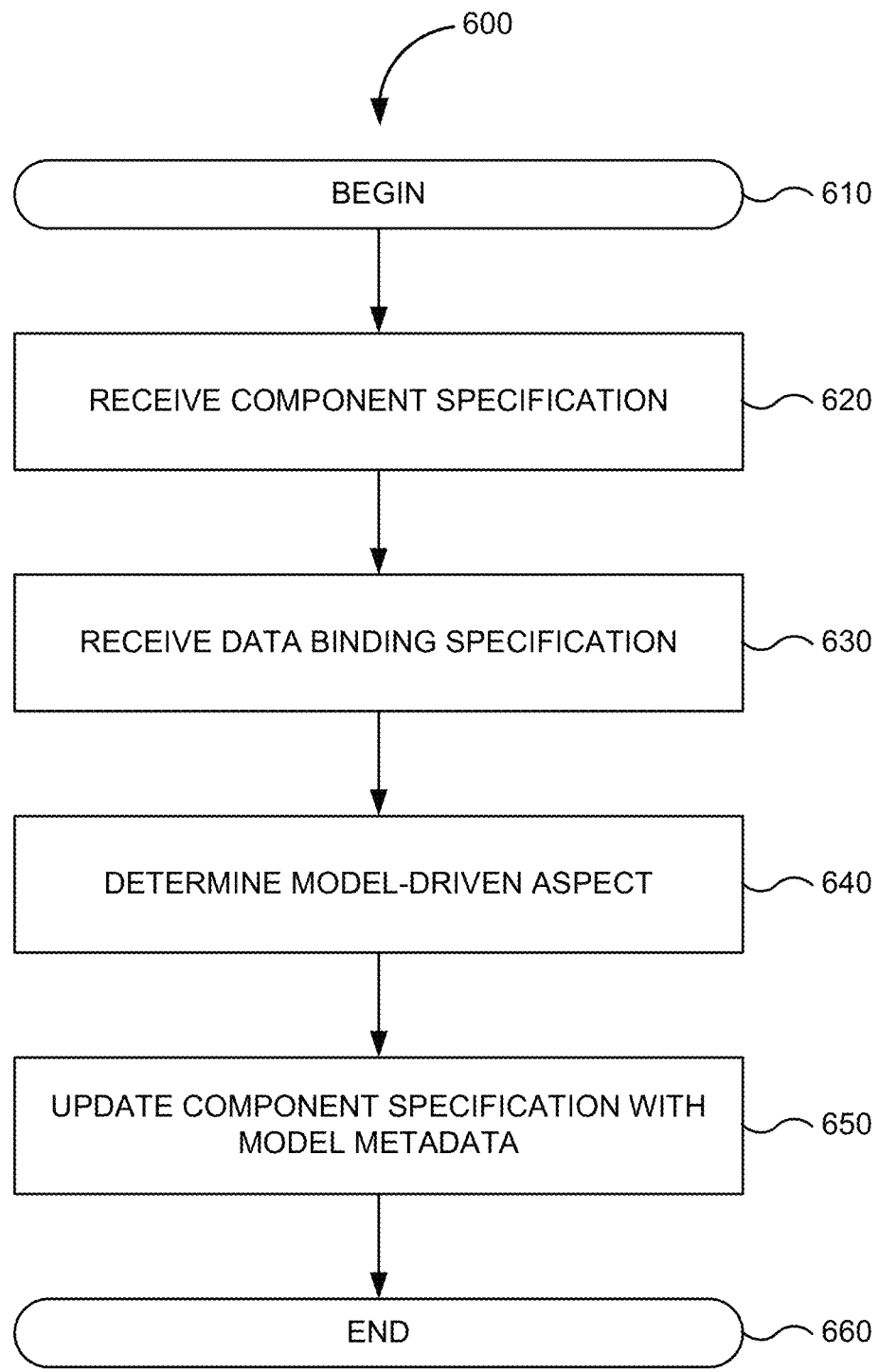
FIG. 6 is a flowchart of a method for designing a model-driven aspect of a component using the desktop integration framework of FIG. 2 in one embodiment according to the present invention.

FIG. 6 is a flowchart of method 600 for designing a model-driven aspect of a component using desktop integration framework 200 of FIG. 2 in one embodiment according to the present invention. Implementations or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, a component specification is received. In general, a component specification refers to information that specifies how the component is defined. According to FIG. 2, a developer can open an existing document or create a new document in application 230, such as creating a new spreadsheet in Microsoft Excel. The developer then may edit, structure, or format the document in any desired manner using native and non-native tools. Additionally, the developer may select from a plurality of predetermined components and add those components to document 250.

In step 630, a data binding specification is received. In general, a data binding specification refers to information that specifies how the component interacts with data, such as its source and the like. In various embodiments, ADF-DI client component 240 utilizes this information to further configure the component in addition to the component specification. In one aspect, ADF-DI client component 240 identifies how each component will present one or more views based on one or more models or objects associated with the component. ADF-DI client component 240 may interact with ADF-DI Server component 270 to retrieve model aspects, values, and the like to configure the component, any associated views, as well as associated behaviors. In various embodiments, ADF-DI client component 240 may receive a component specification and data binding specification in response to a user using the expression builder discussed above.

In step 640, a model-driven aspect of the component is determined. ADF-DI client component 240 may interact with ADF-DI Server component 270 to retrieve model aspects, values, and the like know as attribute properties or hints in ADF model 280 to configure the component, any associated views, as well as associated behaviors. The configuration information may be stored in the document metadata that may be associated with a published document.

In one example, a label that is presented to a user is often different than the name of a data object corresponding to the label. For example, if an attribute called "EmpName" exists but in the UI, a developer desires to display "Employee Name." Most UI frameworks allow the developer to specify a user-friendly label. However, it is not efficient to specify the user-friendly label in each place it needs to appear. The "model-driven" approach is to associate the user-friendly label with the EmpName attribute at the model level. Then, each UI element (page, worksheet, etc) that wants to render EmpName will "refer" to EmpName's label indirectly at design-time and fetch it dynamically at runtime. The approach applies to various different potential properties of a data object. Other examples include "read-only", "mandatory", etc. FIG. 6 ends in step 650.

In some embodiments, a model-driven aspect of a component is determined at runtime rather than at design time. ADF-DI client component 240 may interact with ADF-DI Server component 270 to retrieve model aspects, values, and the like know as attribute properties or hints in ADF model 280 to update or augment configuration information for a component associated with document being rendered.

Application Tool Tips

In various embodiments, methods, systems, and non-transitory computer-readable media are disclosed that allow developers to place tooltips on components and columns headers using a desktop integration framework. The tooltips can be tied to translatable resources or model metadata. In one aspect, the tool tip metadata is provided separately from the document to which the tool tip will eventually be tied.

In one aspect, desktop integration framework 200 allows a developer to provide tool tips associated with elements of document 250 that provide information to a user interacting with application 230. A tool tip may include a useful hint about the content of an element and may appear when a user's mouse is over the element or when the element is selected.

In one aspect, a document designer may desire to include tool tips for given columns, rows, or cells of a spreadsheet application, such as Microsoft Excel. In another aspect, a document designer may desire to include tool tips for a particular form component or a menu command (such as a ribbon interface of Microsoft Office). ADF-DI client component 240 can provide an expression builder that enables a document creator to easily include a "tooltip" property for attributes of a component inserted into document 250. The tool tip property is defined during document creation separately and independently of any tool tip functionality natively provided by application 230. When document 250 is rendered at run time, ADF-DI client component 240 may leverage the native tool tip functionality of application 230 to provide tooltips that appear together with predetermined labels or hints. Because the tool tips are defined separately from document 250, tool tip information may be dynamically obtained by ADF-DI client component 240 from a variety of sources, such as from a static mapping, a resource bundle, or model attribute metadata allowing a developer to associate tool tips with an attribute of a model.

Figure 7:
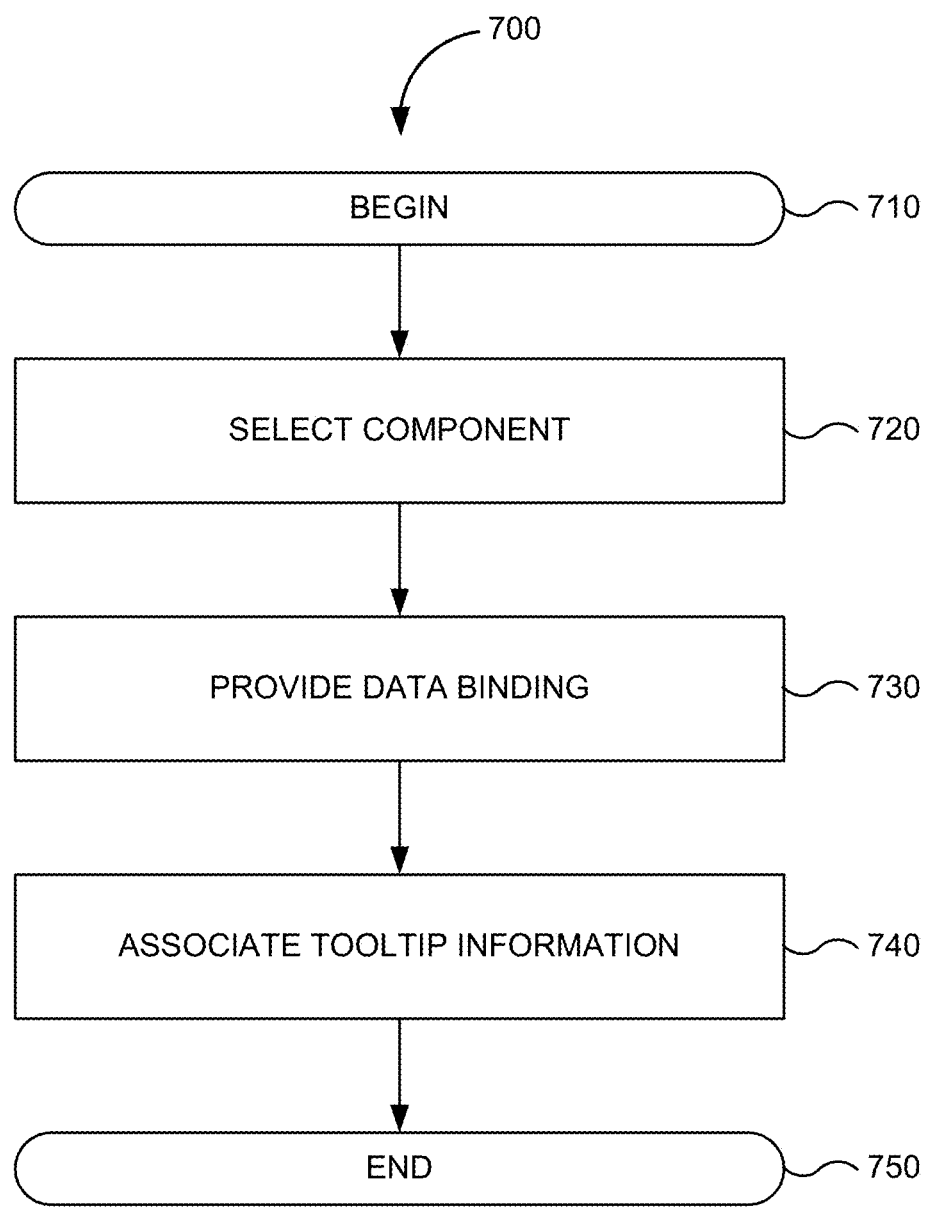
FIG. 7 is a flowchart of a method for designing a document using the desktop integration framework of FIG. 2 that includes one or more tool tips in one embodiment according to the present invention.

FIG. 7 is a flowchart of method 700 for designing a document using desktop integration framework 700 of FIG. 7 to include one or more tool tips in one embodiment according to the present invention. Implementations of or processing in method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 700 depicted in FIG. 7 begins in step 710.

In step 720, a component is selected. As discussed, a document is created using an application that natively creates such documents or using a library that creates the document in a native format. According to FIG. 2, a user can open an existing document or create a new document in application 230, such as creating a new spreadsheet in Microsoft Excel. A document developer may edit, structure, or format the document in any desired manner using native and non-native tools. In various embodiments, a developer selects one or more components from a list of pre-provided components to add the components to the document under design.

In step 730, a data binding is provided. The data binding includes information utilized by ADF-DI client component 240 to render contents of the document based on data obtained from application server 260. In one aspect, the document metadata identifies each component included in the document and how each is bound to one or more objects in ADF model 280. Document metadata may further provide access information, static data, and other logic or data manipulation information provided by the developer.

In step 740, tool tip information is associated with the component. In various embodiments, ADF-DI client component 240 provides and expression builder that includes a "tooltip" property for some or all components that may be added to a document. Some examples in the spreadsheet example above include table column headers, form components (such as Input Texts, Output Texts, Labels, Lists of Values), and worksheet ribbon commands. In one aspect, when a component or column is created from a binding element, a tooltip is automatically set to the model-driven tooltip as illustrated in the following example bindings:

---
Table Columns: #{bindings.<TreeID>.hints.<AttributeID>.tooltip}
Form components: #{bindings.<AttributeID>.hints.tooltip}

---

In various embodiments, tooltips are defined on components rather than utilizing native tooltip aspects of application 230. In one aspect, document contents are rendered during document design to determine how one or more tooltips defined on one or more components behave. In one aspect, a test mode feature can allow document contents to be rendered to test one or more tooltips and when stopping the test mode, ADF-DI client component 240 returns to design-time. At this point, all tooltips created from components are removed to return each component to its design-time appearance.

At runtime, if the tooltip property of a component is non-empty, the expression is evaluated and the resulting text is added to the document. In one aspect, text may be trimmed of whitespace and if the final value is non-empty, inserted into a target cell as an Excel comment. If the target cell already contained an Excel comment, the old comment is removed and replaced with the new one. If the expression evaluation fails, no action is taken. The tooltips for form components follow the same rules as labels. Namely, they are calculated and rendered once only. When the user places the mouse over the ribbon command without clicking, a multi-part tooltip appears. The command label appears first in bold followed by the text from the tooltip property. Below this text, the add-in name appears. The tooltips for column headers are evaluated and rendered whenever the table column headers are rendered. FIG. 7 ends in step 750.

Accordingly, a document designer may include tool tips for given columns, rows, or cells of a spreadsheet application, such as Microsoft Excel. In another aspect, a document designer may desire to include tool tips for a particular form component or a menu command (such as a ribbon interface of Microsoft Office). ADF-DI client component 240 can provide an expression builder that enables a document creator to easily include a "tooltip" property for attributes of a component inserted into document 250. The tool tip property is defined during document creation separately and independently of any tool tip functionality natively provided by application 230. When document 250 is rendered at run time, ADF-DI client component 240 may leverage the native tool tip functionality of application 230 to provide tooltips that appear together with predetermined labels or hints. Because the tool tips are defined separately from document 250, tool tip information may be dynamically obtained by ADF-DI client component 240 from a variety of sources, such as from a static mapping, a resource bundle, or model attribute metadata allowing a developer to associate tool tips with an attribute of a model.

Figures 8, 9:
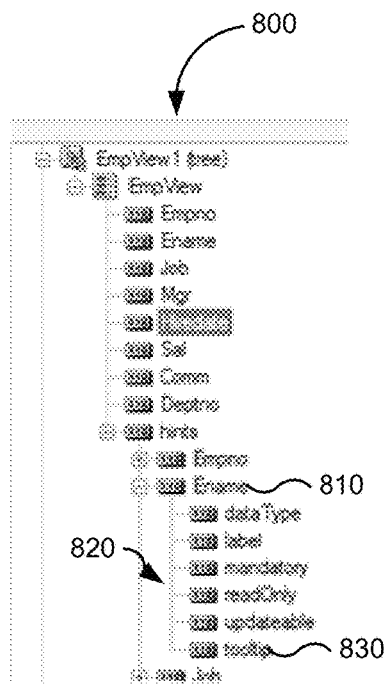
FIG. 8 is an illustration of a screenshot of a set of document attributes that enable a user to define a tool tip attribute in one embodiment according to the present invention.
FIG. 9 is an illustration of a screenshot of data bindings that enable a user to bind a tool tip attribute to a document element in one embodiment according to the present invention.

FIG. 8 is an illustration of screenshot 800 of set of document attributes that enable a user to define a tool tip attribute in one embodiment according to the present invention. In this example, "Ename" attribute 810 includes a set of attributes 820. "Tooltip" attribute 830 is used to define tooltip information for a component.

FIG. 9 is an illustration of screenshot 900 of data bindings that enable a user to bind a tool tip attribute to a document element in one embodiment according to the present invention. In this example, the tooltip data binding is mapped to "#{bindings.EmpView1.hints.Ename.tooltip}."

In various aspects, tooltip information is delivered separately from the published document. Tooltip information may be transmitted with the actual data to be rendered as the contents of document 250. In one embodiment, ADF-DI client component 240 renders tooltip information utilizing native features of application 230. For example, ADF-DI client component 240 may insert tooltip information as comments, help text, and the like utilizing APIs or other functionality native to application 230.

Figure 10:
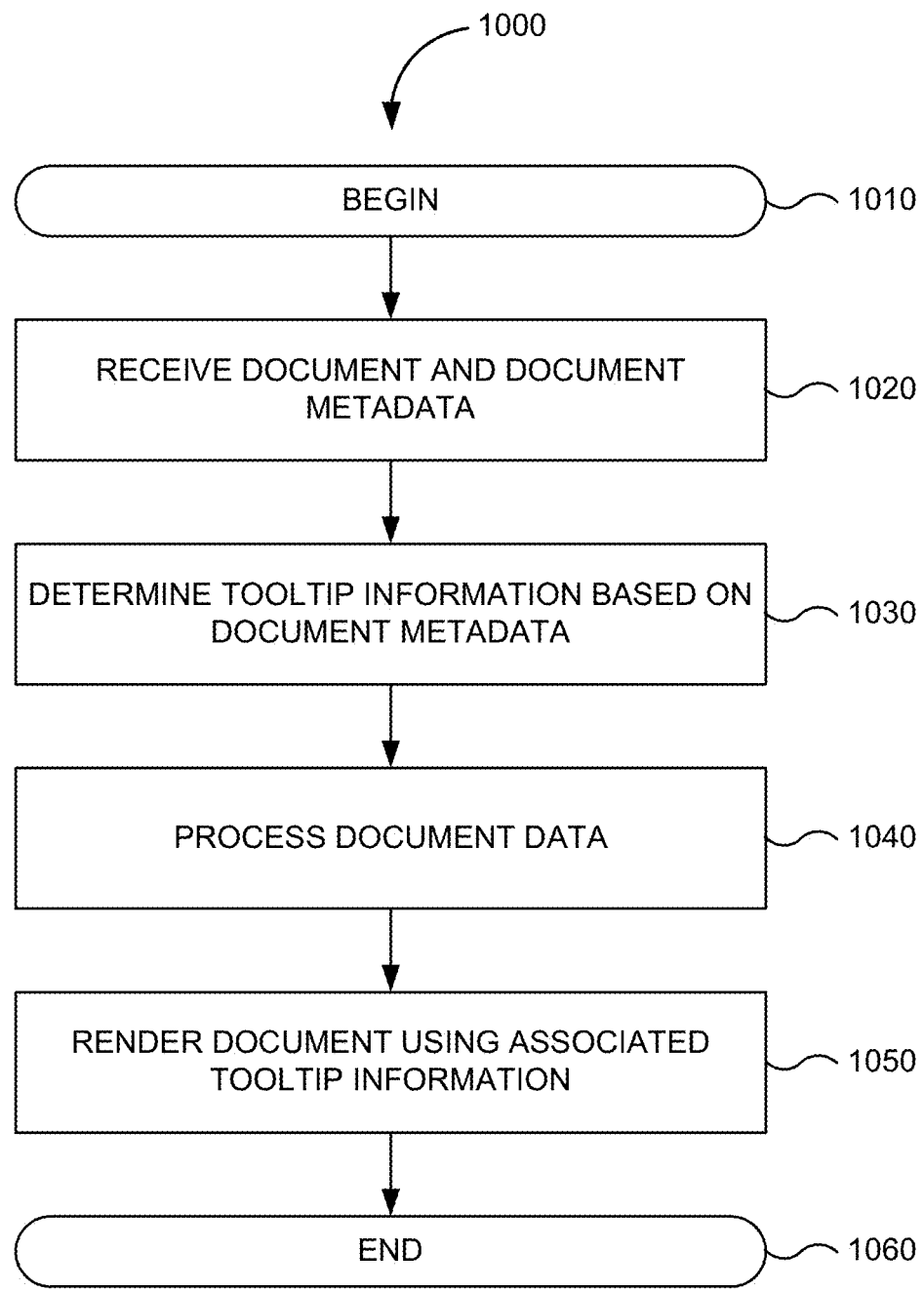
FIG. 10 is a flowchart of a method for interacting with a document using the desktop integration framework of FIG. 2 that includes one or more tool tips in one embodiment according to the present invention.

FIG. 10 is a flowchart of method 1000 for interacting with a document using desktop integration framework 200 of FIG. 2 that includes one or more tool tips in one embodiment according to the present invention. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1020, a document and its corresponding metadata are received. According to FIG. 2, a user can interact with application server 260 to retrieve a desired document, such as by clicking a document link. The document and metadata may be downloaded or otherwise communicated to desktop 210 and opened in application 230.

In step 1030, tooltip information is determined based on the document metadata. As discussed above, the document metadata includes information utilized by ADF-DI client component 240 to render contents of the document based on data obtained from application server 260. Accordingly, ADF-DI client component 240 determines which components are to be added to the document and where and what data is used by each component as well as applies any logic defined by a developer. ADF-DI client component 240 further determines whether any components have associated tool tips of other associated help information.

In step 1040, document data is processed. As discussed above, published documents can be stored separately from the document metadata and the actual data used by the document. In general, the published document includes at least enough metadata that enables ADF-DI client component 240 to initialize the document and request additional information from ADF-DI server component 270 to render the contents of document 250 for the user.

In step 1050, the document is rendered using any associated tooltip information. As discussed above, ADF-DI client component 240 may retrieve from or through ADF-DI server component 270 data from ADF model 280 or other logic associated with document 250. ADF-DI client component 240 may further retrieve from or through from ADF-DI server component 270 any metadata that includes tooltip information or other associated information. Finally, ADF-DI client component 240 may then render contents of document 250 utilizing the associated tooltip information. FIG. 10 ends in step 1060.

Figures 11, 12:
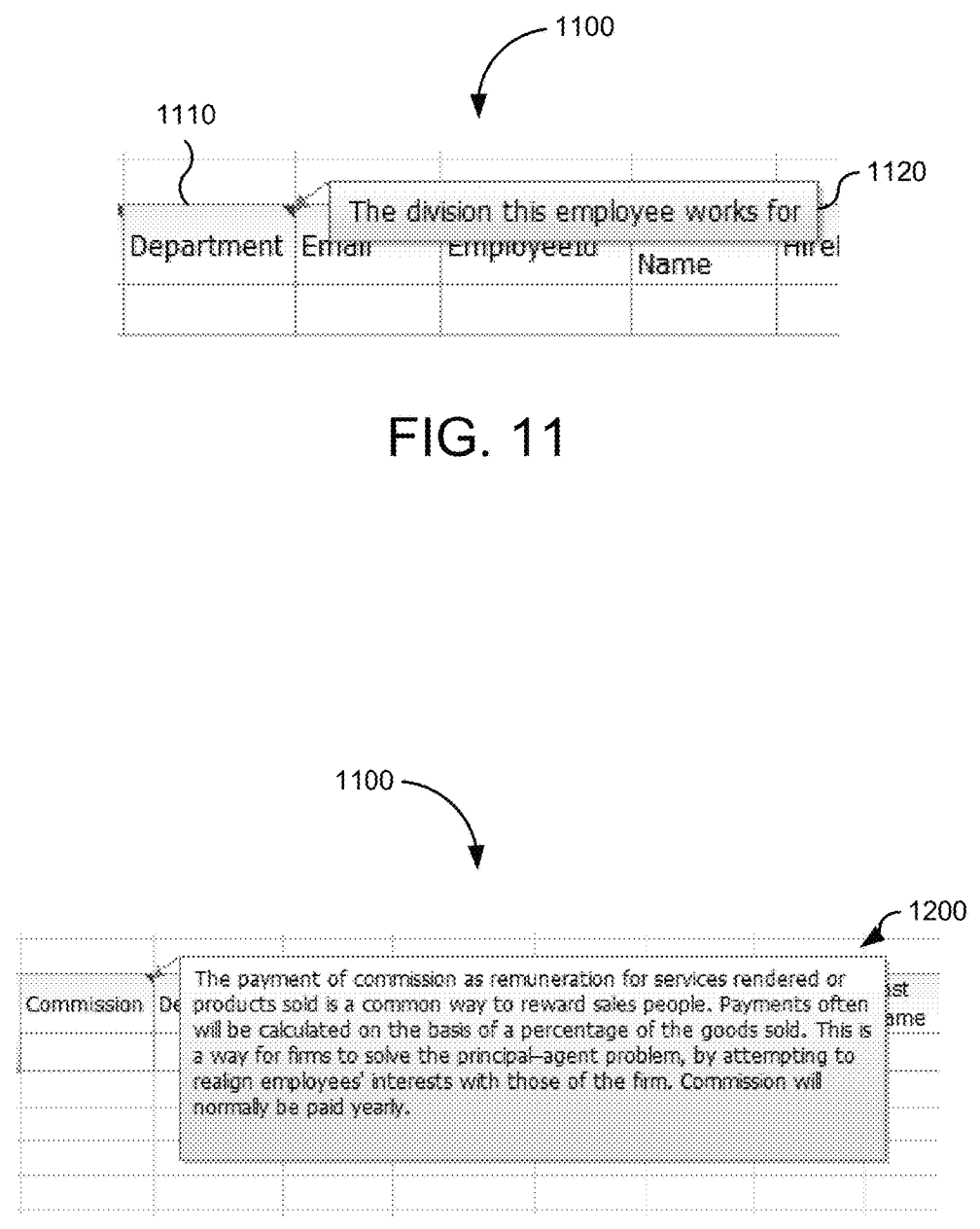

FIGS. 11 and 12 are illustrations of screenshots of tool tips defined using desktop integration framework 200 of FIG. 2 in one embodiment according to the present invention. In FIG. 11, table 1100 includes column 1110. One or more visual indicators are placed on or near column 1110 to indicate that tooltip information is available. When a user selects or otherwise interacts with column 1110, tooltip information 1120 is displayed or otherwise conveyed to the user. In this example, only a shorted portion of tooltip information 1120 is displayed. When a user selects or otherwise interacts with a shortened version of tooltip information, a longer version 1200 may be displayed or otherwise conveyed to the user as illustrated in FIG. 12. In some embodiments, a tooltip is shown in full. A tooltip box can be automatically resized to fit texts of arbitrary length.

Automatic Column Resizing

In various embodiments, methods, systems, and non-transitory computer-readable media are disclosed that allow developers to provide automatic column resizing in spreadsheet software using a desktop integration framework. The width of a column usually can only be set to hard-wired widths or manually adjusted to fit (even with a manually triggered auto adjustment function). This feature adds the ability to control column widths in tables at run time.

In one aspect, desktop integration framework 200 allows a developer to provide automatic resizing of elements of document 250 for a user interacting with application 230 according to aspects of the data being rendered in document 250. A document designer may desire to adjust for example dimensions of columns, rows, or cells of a spreadsheet application, such as Microsoft Excel. ADF-DI client component 240 can provide an expression builder that enables a document creator to easily include a "column width" or "display width" property of attributes whose data a component will insert into document 250. This dimension property is defined during document creation separately and independently of the dimensions of any elements natively provided by application 230. When document 250 is rendered at run time, ADF-DI client component 240 may leverage the native functionality of application 230 to manipulate the dimensions of the data within the user interface automatically. Because the dimensions are defined separately from document 250, dimension specifications may be dynamically obtained by ADF-DI client component 240 from a variety of sources, such as from a static mapping, a resource bundle, or model attribute metadata allowing a developer to associate dimensions with an attribute of a model.

In various embodiments, desktop integration framework 200 allows a developer to provide automatic column resizing associated with elements of document 250 for a user interacting with application 230. In one aspect, a document designer may desire that certain columns of a spreadsheet application, such as Microsoft Excel, have a specified width. ADF-DI client component 240 can provide an expression builder that enables a document creator to easily provide column resizing for a component inserted into document 250. In one aspect, ADF-DI client component 240 provides the ability to configure a table so that all columns widths are set using at runtime with an AutoFit feature of application 230.

In another aspect, ADF-DI client component 240 provides the ability to include/exclude the table columns header cells when determining the best fit. ADF-DI client component 240 may provide the ability to specify an explicit column width in the ADF table column configuration. ADF-DI client component 240 further may provide the ability to bind the column width property to Model-level metadata properties (e.g., UI Hint displayWidth). In another aspect, ADF-DI client component 240 may provide the ability to bind the width property of a dynamic column to Model-level properties and obtain a distinct column size for each "expanded" column at runtime. ADF-DI client component 240 may provide the ability for dynamic columns to participate in AutoFit and obtain a distinct column size for each "expanded" column at runtime. ADF-DI client component 240 may further include the ability to inherit/override table-level column resizing behavior on a column-by-column basis (a subset of columns in a given table use AutoFit and/or Explicit sizing, leaving other columns alone). ADF-DI client component 240 may also provide the ability to configure when the table's columns are resized.

Accordingly, a workbook developer can choose to configure a table component so that the widths of columns are set at run time. Columns can be set to explicit sizes based on an Expression Language (EL) expression or they can use Excel's AutoFit Column Size capability to achieve the best fit for the current data values. Resizing behavior can be set at the table level and then overridden at the column level. At runtime, the resizing behavior can be invoked via a new table component method, allowing the developer to control when the resizing occurs if the contents of the document change.

Figure 13:
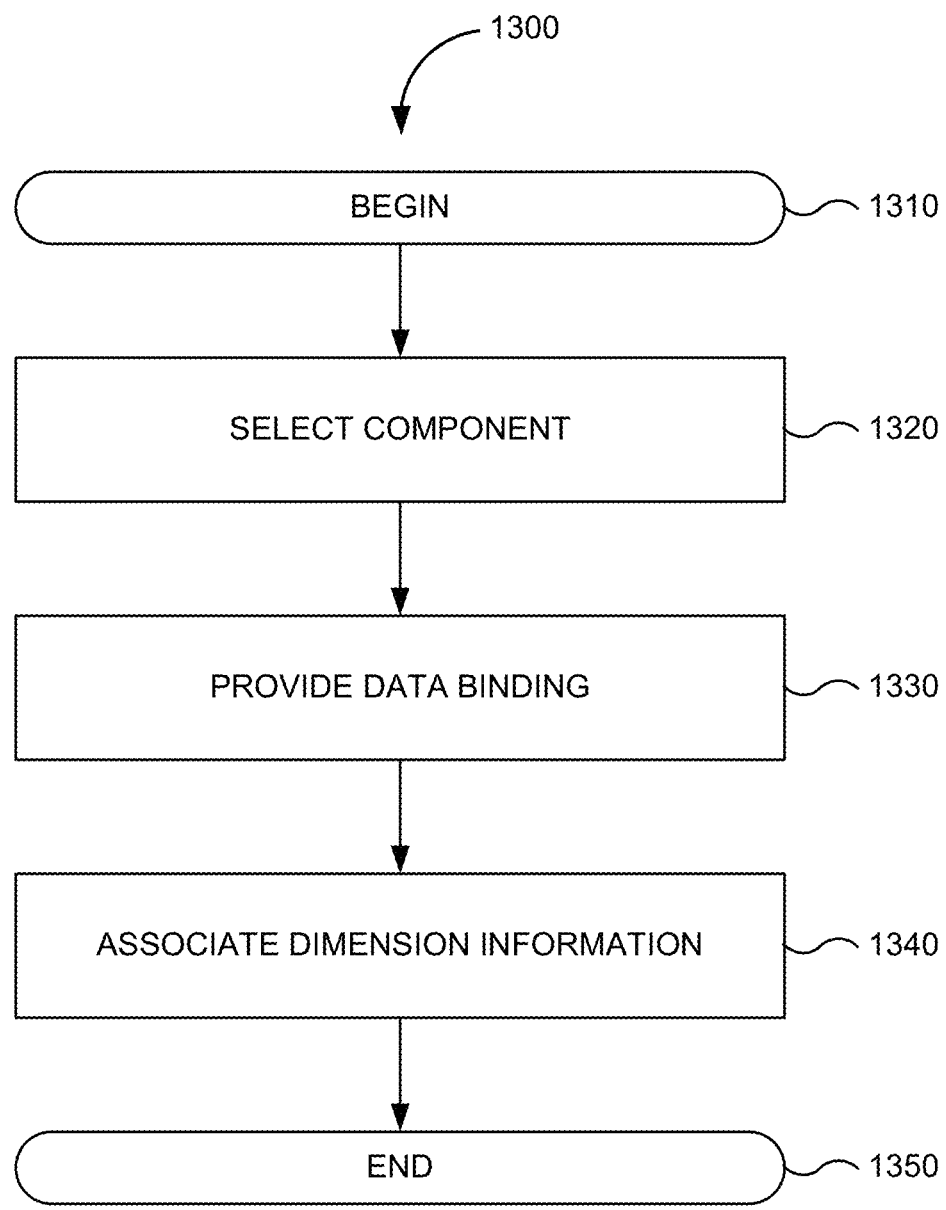
FIG. 13 is a flowchart of a method for designing a document using the desktop integration framework of FIG. 2 that includes automatic dimensioning of data in one embodiment according to the present invention.

FIG. 13 is a flowchart of method 1300 for designing a document using desktop integration framework 1300 of FIG. 13 to provide automatic column resizing in spreadsheet software in one embodiment according to the present invention. Implementations of or processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1300 depicted in FIG. 13 begins in step 1310.

In step 1320, a component is selected. As discussed, a document is created in an application that natively creates such documents or using a library that creates the document in a native format. According to FIG. 2, a user can open an existing document or create a new document in application 230, such as creating a new spreadsheet in Microsoft Excel. A document developer may edit, structure, or format the document in any desired manner using native and non-native tools. Furthermore, the developer may select from a list of pre-provided components or the developer may create one or more components to add to the document.

In step 1330, data binding is provided. The data binding includes information utilized by ADF-DI client component 240 to render contents of the document based on data obtained from application server 260. In one aspect, the document metadata identifies each component included in the document and how each component is bound to one or more objects in ADF model 280. Document metadata may further provide access information, static data, and other logic or data manipulation information provided by the developer.

As discussed above, a workbook developer can choose to configure a table component so that the widths of columns are set at run time. Columns can be set to explicit sizes based on an EL expression or they can use Excel's AutoFit Column Size capability to achieve the best fit for the current data values. Resizing behavior can be set at the table level and then overridden at the column level. At runtime, the resizing behavior can be invoked via a new table component method, allowing the developer to control when the resizing occurs if the contents of the document change.

In step 1340, dimension information is associated with the component. In various embodiments, ADF-DI client component 240 provides and expression builder that includes a column size property for some or all components that may be added to a document. In one aspect, a ResizeColumnsMode property is provided that controls whether and how columns in an entire table are resized. A Width property can be applicable when a ResizeMode property governing how the size of a column changes at runtime is SpecifiedWidth (and when Table.ResizeColumnsMode is UseColumnValue). In one embodiment, Excel interprets the Width value N, as representing the space needed to display N '0' (zero) characters when formatted with the font used by the Normal style. An example EL expression for Width that makes use of the UI Hint "displayWidth" for an attribute:

{bindings.EmployeesPlusView1.hints.FirstName.displayWidth}

Accordingly, a workbook developer can choose to configure a table component so that the widths of columns for example are set at run time. FIG. 13 ends in step 1350.

Figure 14:
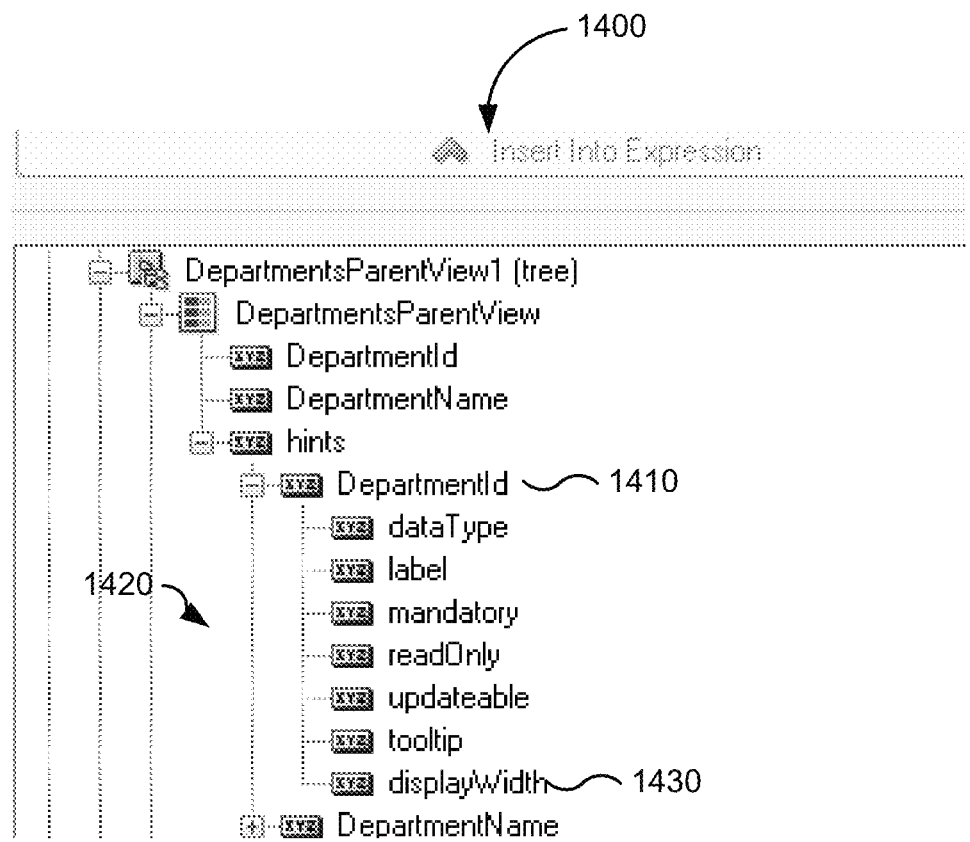
FIG. 14 is an illustration of a screenshot of a set of document attributes that enable a user to define automatic column resizing in one embodiment according to the present invention.

FIG. 14 is an illustration of screenshot 1400 of a set of document attributes that enable a user to define automatic column resizing in one embodiment according to the present invention. In this example, "DepartmentId" attribute 1410 includes a set of attributes 1420. "displayWidth" attribute 1430 is used to define resizing information for a component.

Figure 15:
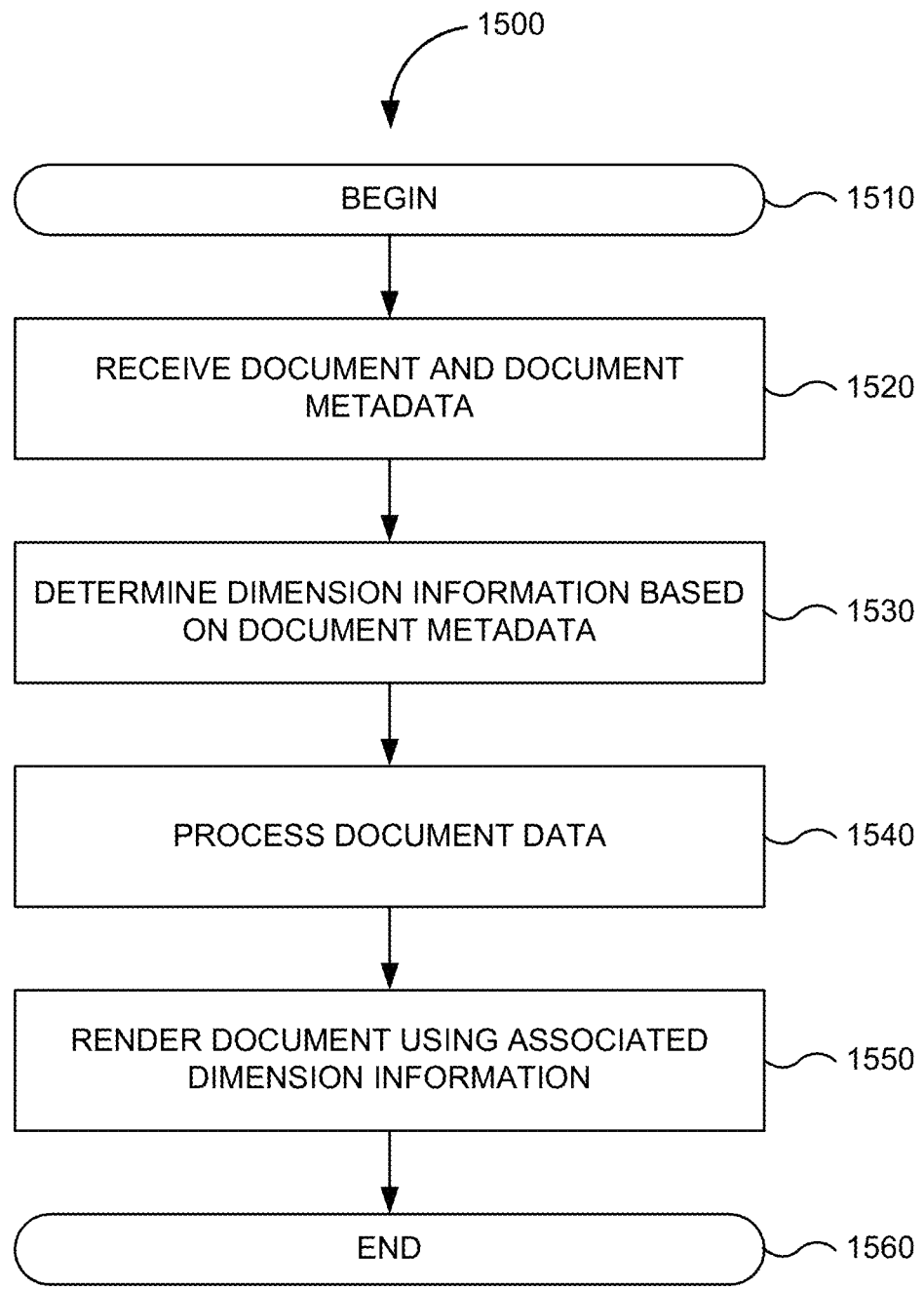
FIG. 15 is a flowchart of a method for interacting with a document using the desktop integration framework of FIG. 2 that includes automatic dimensioning of data in one embodiment according to the present invention.

FIG. 15 is a flowchart of method 1500 for interacting with a document using desktop integration framework 200 of FIG. 2 that includes automatic dimensioning of data in one embodiment according to the present invention. Implementations of or processing in method 1500 depicted in FIG. 15 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1500 depicted in FIG. 15 begins in step 1510.

In step 1520, a document and its corresponding metadata are received. As discussed above, documents are published enabling users to access the documents via a browser and begin working within an application (e.g., application 230). In various embodiments, a user selects a document from a web-based application to use as an interface to data provided by the web-based application. The user downloads the document to the user's computer and opens the document using its native application. A plugin of the native application or other software of the client device (e.g., ADF-DI client component 240) detects that the document is an integrated document and begins the rendering process.

In various embodiments, the document metadata is received separately from the document being rendered. In some embodiments, all or part of the document metadata is integrated into the document being rendered. The document metadata includes information utilized by the integration component to render contents of the document. In one aspect, model metadata may optionally be fetched and the document metadata can be updated or augmented based on the model metadata.

In step 1530, dimension information is determined based on the document metadata. For example, ADF-DI client component 240 can determine that some components are to be added to the document and are associated with dimension information. In various aspects, dimension or resizing information can be fetched as model metadata. Dimension or resizing information can also be transmitted with the actual data to be rendered as the contents of document 250.

In step 1540, document data is processed. As discussed above, published documents can be stored separately from the document metadata and the actual data used by the document. In general, the published document includes at least enough metadata that enables ADF-DI client component 240 to initialize the document and request additional information from ADF-DI server component 270 to render the contents of document 250 for the user.

In step 1550, the document is rendered using any associated dimension information. As discussed above, ADF-DI client component 240 may retrieve from or through from ADF-DI server component 270 data from ADF model 280 or other logic associated with document 250. ADF-DI client component 240 may further retrieve from or through from ADF-DI server component 270 any metadata that includes dimension information or other associated resizing information. Finally, ADF-DI client component 240 may then render contents of document 250 utilizing the associated dimension information. FIG. 15 ends in step 1560.

In one embodiment, ADF-DI client component 240 resizes column widths utilizing native features of application 230 based on values in the Table.ResizeColumnsMode and Column.ResizeMode properties. In another embodiment, ADF-DI client component 240 resizes column widths utilizing native features of application 230 based on values in the Table.ResizeColumnsMode and Column.ResizeMode properties to fit to the data-utilizing auto fit functionality of application 230.

In one aspect, a table component may be configured to use column values of document 250. In this case, no automatic resizing of the entire table takes place. If individual columns have ResizeMode properties set to a value other than InheritFromTable, those columns will be resized accordingly. In another aspect, a table component may be configured such that contents are automatically fit with a header. Accordingly, all columns within table boundaries that have Column.ResizeMode set to InheritFromTable are resized using Excel's native AutoFit support. In this mode, the column header cells are included when finding the best fit. Values in the column's cells above or below the table are not considered when finding the best fit. In another aspect, a table component may be configured such that contents are automatically fit without reference to a header. This is the same as above, except that only the data cells in the table columns are included and the header cells are excluded when finding the best fit.

Depending on settings, a column may inherit its resizing behavior from the Table, override the Table-level behavior, or not resize at all. If a manual configuration is provided, the column is not resized and any column width is left at the current setting. InheritFromTable specifies that a column be resized using the AutoFit setting from Table.ResizeColumnsMode (but if Table.ResizeColumnsMode is UseColumnValue, then no resizing occurs). As above, AutoFitWithHeader allows a column to be resized using Excel's native AutoFit support. In this mode, the column header cell is included when finding the best fit. AutoFitWithoutHeader provides the same as AutoFitWithHeader, except that the header cell is excluded when finding the best fit.

In some embodiments, SpecifiedWidth uses a Width property to determine the desired width of the column. If the expression cannot be evaluated, or if the expression evaluates to a number outside a min-max range (e.g., 1-255), a ResizeMode of Manual mode is used (no resizing).

In some embodiments, the displayWidth UI Hint metadata is retrieved when the worksheet is first initialized and cached for the lifetime of the workbook. For dynamic columns, the displayWidth UI hint is re-retrieved and re-cached whenever the expanded column structure changes—detected as part of a Download operation or Table.Initialize execution. Other cases where the worksheet's page definition metadata is re-cached can include Clear All Data, detection of a metadata schema change.

Example Scenario #1

1. Workbook developer changes the Table.ResizeColumnsMode property to, say, AutoFitAllWithHeader
2. Adds the Table.ResizeColumns component action into the action set for downloading data into the table, following the Table.Download action.

This will have the effect at runtime that after data is downloaded into the table, all table columns with be resized using the best fit based on the width of the data and header label text Example Scenario #2

1. Workbook developer leaves the Table.ResizeColumnsMode property set to UseColumnValue
2. Changes the ResizeMode property on one or more columns to SpecifiedWidth.
3. On the same columns, uses the Expression Builder to paste in the expression referencing the UI Hint from the model metadata, eg. #{bindings.EmployeesView1.hints.Email.displayWidth}
4. Adds the Table.ResizeColumns component action into a new action set exposed as a Button, labeled "Resize Table"

At runtime all worksheet columns will stay at their DT widths, even after a Download. When the end-user clicks the Resize Table button, those columns altered in step 2 will be resized according to their UI Hint "displayWidth" values (if those hints are configured and valid).

Table and Form

Consider the case of a worksheet with form components above a table. The table resizes the Excel worksheet columns as needed without any regard to the effect on the form components located in the same Excel columns.

Multiple Tables

Consider the case of a worksheet with two (or more) ADFdi table components. Each table attempts to resize the Excel worksheet column independently. The last one "wins." The order is determined by the calls to the table actions. Developers with multiple tables might choose a manual width mode for "less important" table in order to allow a specific table to dominate the Excel column sizing.

Application Date Picker

In various embodiments, methods, systems, and non-transitory computer-readable media are disclosed that allow developers to place a date picker within a spreadsheet using a desktop integration framework. The date picker can be tied to model metadata. In one aspect, the date picker metadata is provided separately from the document to which the date picker will eventually be tied.

Sometimes, a developer may need to preformat a portion of a document to specify what type of data will be received by end users. For example, a cell of a spreadsheet or workbook typically does not know how to format data entered into the cell until either the data is received or a developer explicitly formats the cell.

In various embodiments, desktop integration framework 200 allows a developer to add components to a document that provide date pickers associated with elements of document 250. Accordingly, a user interacting with application 230 can quickly provide date and time information outside of any native features of the application. Therefore, the developer does not need to explicitly format cells as date cells in a workbook. A date picker may include one or more calendar views, clocks, or other date and time picker elements and may appear when a user's mouse is over an element or when the element is selected.

In one aspect, a document designer may desire to include date pickers for given columns, rows, or cells of a spreadsheet application, such as Microsoft Excel. In another aspect, a document designer may desire to include a date picker for a particular form component or a menu command. ADF-DI client component 240 can include a date picker component that may be inserted into document 250. The date picker component is defined during document creation separately and independently of any date picker functionality natively provided by application 230. When document 250 is rendered at run time, ADF-DI client component 240 may leverage native date picker functionality of application 130 to provide date pickers, leverage separate operating system elements or functionality to provide date pickers, or leverage custom library functionality to provide date pickers. Because date pickers are defined separately from document 250, date pickers may be dynamically rendered by ADF-DI client component 240 for a variety of targets, such as for form component, input date columns, and a model-driven column with date attribute model allowing a developer to associate a date picker with an attribute of a model.

Figure 16:
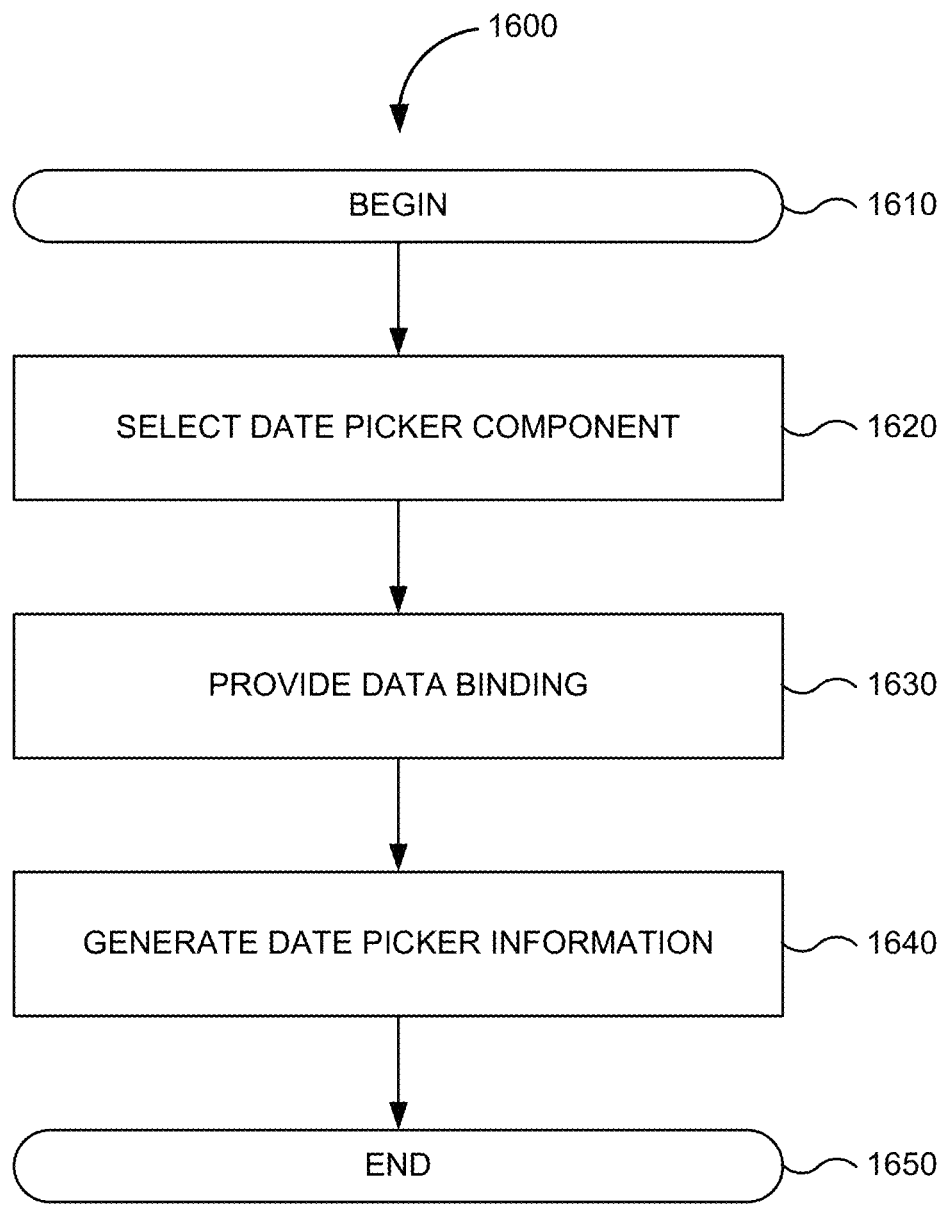
FIG. 16 is a flowchart of a method for designing a document using the desktop integration framework of FIG. 2 that includes a date picker in one embodiment according to the present invention.

FIG. 16 is a flowchart of method 1600 for designing a document using desktop integration framework 1600 of FIG. 16 to provide a date picker in spreadsheet software in one embodiment according to the present invention. Implementations of or processing in method 1600 depicted in FIG. 16 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1600 depicted in FIG. 16 begins in step 1610.

In step 1620, a component is selected. As discussed, a document is created in an application that natively creates such documents or using a library that creates the document in a native format. According to FIG. 2, a user can open an existing document or create a new document in application 230, such as creating a new spreadsheet in Microsoft Excel. A document developer may edit, structure, or format the document in any desired manner using native and non-native tools. Furthermore, the developer may select from a list of pre-provided components or the developer may create one or more components to add to the document. In one example, a date component (or date picker component) is selected. In another example, a component for a model-driven column type is selected that provides a date picker.

In step 1630, data binding is provided. The data binding includes information utilized by ADF-DI client component 240 to render contents of the document based on data obtained from application server 260. In one aspect, the document metadata identifies each component included in the document and how each component is bound to one or more objects in ADF model 280. Document metadata may further provide access information, static data, and other logic or data manipulation information provided by the developer.

In step 1640, date picker information is generated. In various embodiments, ADF-DI client component 240 provides an expression builder that includes a date picker property for some or all components that may be added to a document. In one aspect, when a component or column is created from a binding element, a date picker is automatically set as illustrated in the following example bindings:

Table DatePickerEnabled: True/False

A model-driven component may include an action set property. If a column is bound to a date type attribute, the DatePickerEnabled property may be used to determine the behavior. If DatePickerEnabled is true, the subcomponent type of date column is InputDate and the action set is ignored. If DatePickerEnabled is false, the subcomponent type is determined as before and the action set is used.

At runtime, an end user can select a cell, column, row, or other element of application 230 bound to an date picker component triggering a modeless dialog to appear. The dialog may contain an appropriately sized calendar or other date and time information selector. The user can pick a date from the month currently displayed. The user can also navigate to other months (in the past and in the future) and then pick a date. The user may further pick a time from the time currently displayed. The user can also change the time to a different value and then pick that time. In one aspect, a single click on a date closes the date picker dialog and updates the cell with that date. In another aspect, a click on a button labeled "OK" or "APPLY" closes the date picker dialog and updates the cell with any selected date and/or time information.

In various embodiments, date pickers may be defined as components or on components rather than utilizing native tooltip aspects of application 230. In one aspect, document contents are rendered during document design to determine how one or more date pickers defined as or on one or more components behave. In one aspect, a test mode feature can allow document contents to be rendered to test one or more date pickers and when stopping the test mode, ADF-DI client component 240 returns to design-time. At this point, all date pickers created as or from components are removed to return each component to its design-time appearance. FIG. 16 ends in step 1650.

Accordingly, a document designer may include date pickers for given columns, rows, or cells of a spreadsheet application, such as Microsoft Excel. In another aspect, a document designer may desire to include date picker components or a menu command. ADF-DI client component 240 can provide an interface and/or an expression builder that enables a document creator to easily include one or more date picker components or set a date picker property for attributes of a component inserted into document 150. The date picker is defined during document creation separately and independently of any functionality natively provided by application 230 or existing data. When document 250 is rendered at run time, ADF-DI client component 240 may leverage the native or non-native functionality of application 230 to provide date pickers that enable a user to select date and time information.

Figure 17:
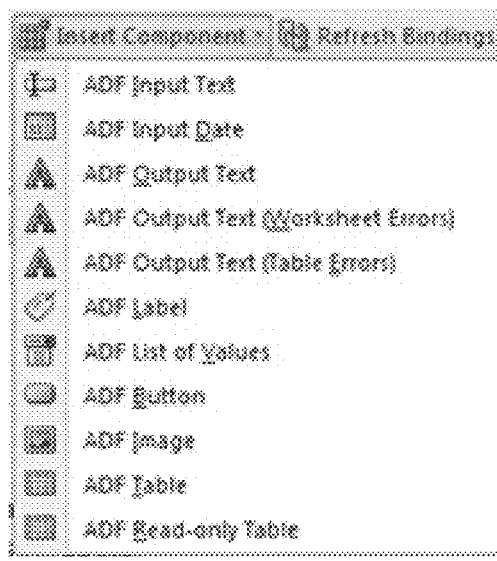
FIG. 17 is an illustration of a screenshot of an interface that enables a user to add a date picker component to a document in one embodiment according to the present invention.

FIG. 17 is an illustration of a screenshot of interface 1700 that enables a user to add a date picker component to a document in one embodiment according to the present invention. In this example, a date picker component may be inserted from an "Insert Component" ribbon menu provided by application 230.

Figure 18:
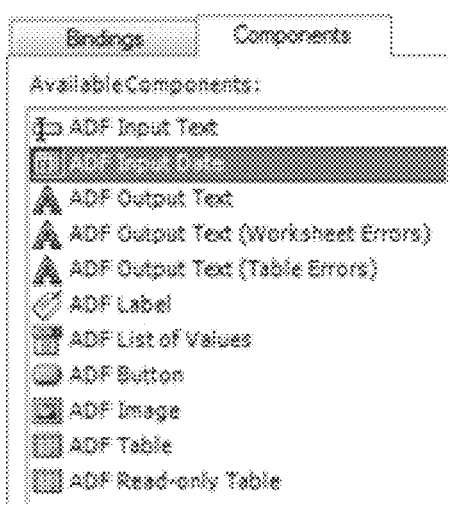
FIG. 18 is an illustration of a screenshot of another interface that enables a user to add a date picker component to a document in one embodiment according to the present invention.

FIG. 18 is an illustration of a screenshot of another interface 1800 that enables a user to add a date picker component to a document in one embodiment according to the present invention. In this example, a date picker component may be inserted from a list of insertable components provided by ADF-DI client component 240.

Figure 19:
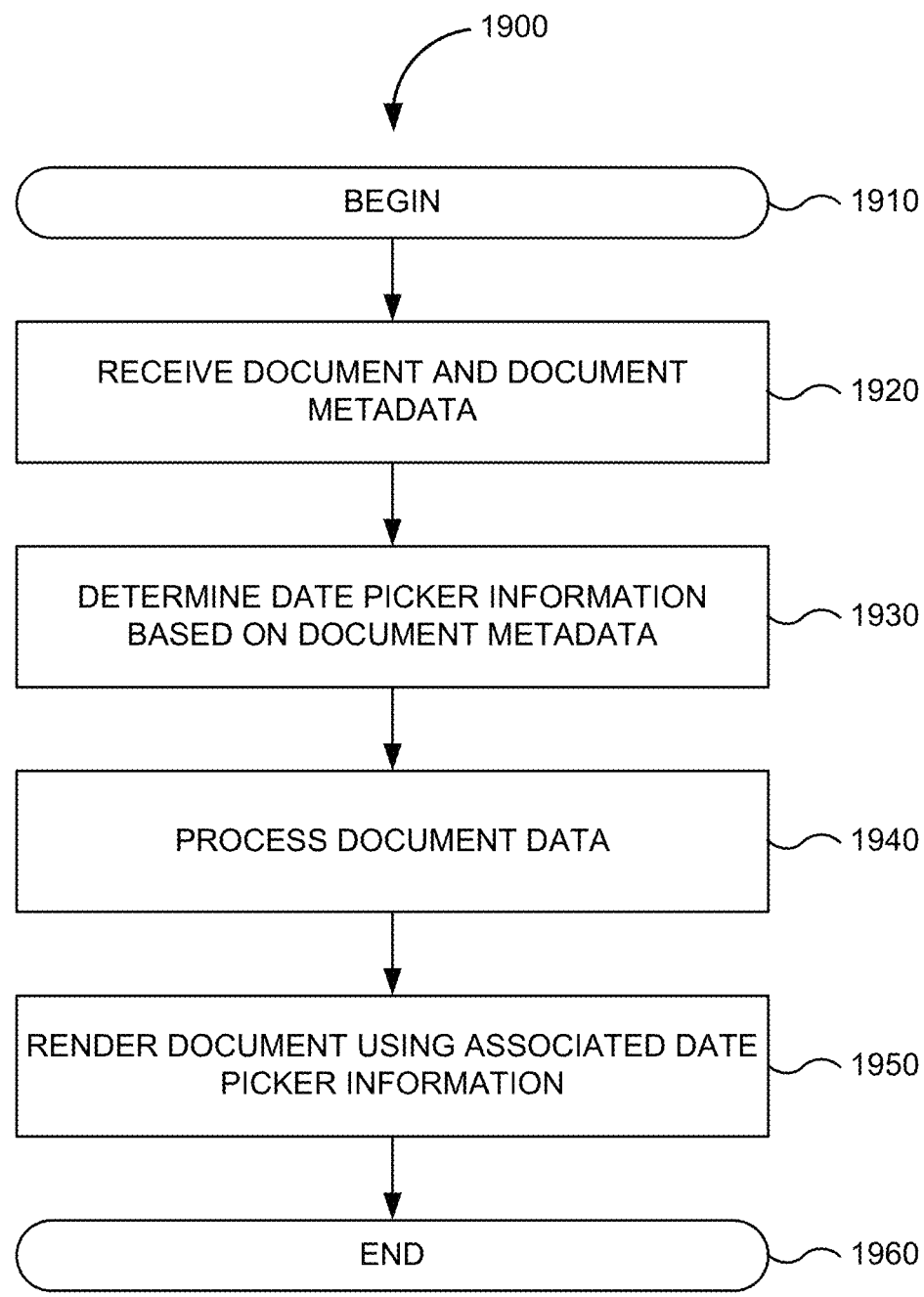
FIG. 19 is a flowchart of a method for interacting with a document using the desktop integration framework of FIG. 2 that includes one or more date pickers in one embodiment according to the present invention.

FIG. 19 is a flowchart of method 1900 for interacting with a document using desktop integration framework 200 of FIG. 2 that includes one or more date pickers in one embodiment according to the present invention. Implementations of or processing in method 1900 depicted in FIG. 19 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1900 depicted in FIG. 19 begins in step 1910.

In step 1920, a document and its corresponding metadata are received. According to FIG. 2, a user can interact with application server 260 to retrieve a desired document, such as by clicking a document link. The document and metadata may be downloaded or otherwise communicated to desktop 210 and opened in application 230.

In step 1930, date picker information is determined based on the document metadata. As discussed above, the document metadata includes information utilized by ADF-DI client component 240 to render contents of the document based on data obtained from application server 260. Accordingly, ADF-DI client component 240 determines which components are to be added to the document and where and what data is used by each component as well as applies any logic defined by a developer. ADF-DI client component 240 further determines whether any components have associated date picker information. In various aspects, date picker information is delivered separately from the published document. Date picker information may be transmitted with the actual data to be rendered as the contents of document 250.

In step 1940, document data is processed. As discussed above, published documents can be stored separately from the document metadata and the actual data used by the document. In general, the published document includes at least enough metadata that enables ADF-DI client component 240 to initialize the document and request additional information from ADF-DI server component 270 to render the contents of document 250 for the user.

In step 1950, the document is rendered using any associated date picker information. As discussed above, ADF-DI client component 240 may retrieve from or through from ADF-DI server component 270 data from ADF model 280 or other logic associated with document 250. ADF-DI client component 240 may further retrieve from or through from ADF-DI server component 270 any metadata that includes date picker information or other associated time and date selection information. Finally, ADF-DI client component 240 may then render contents of document 250 utilizing the associated date picker information.

In one embodiment, ADF-DI client component 240 renders date picker dialogs utilizing non-native or native features of application 230. For example, ADF-DI client component 240 may insert date pickers utilizing APIs or other functionality native to application 230. In another example, ADF-DI client component 240 may insert date pickers utilizing APIs or other functionality external to application 230. One or more transfer or translation mechanisms may be used to insert information obtained using external APIs into application 230, such as operating system clipboards and the like. FIG. 19 ends in step 1960.

Figure 20:
FIGS. 20 and 21 are illustrations of screenshots of a rendered date picker component using the desktop integration framework of FIG. 2 in various embodiments according to the present invention.
Figure 21:
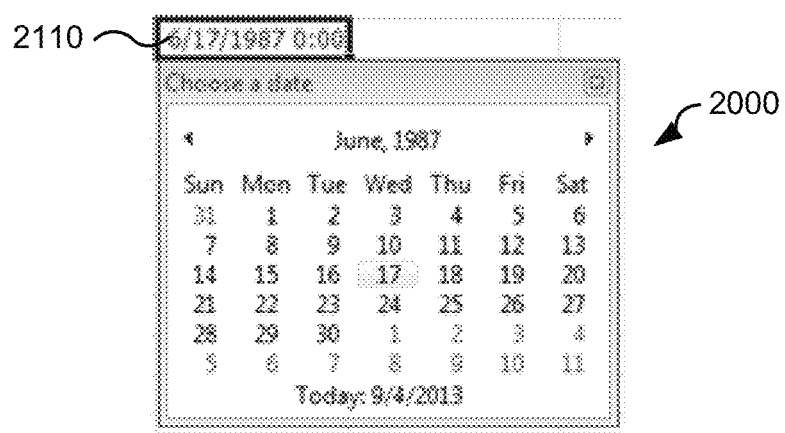

FIGS. 20 and 21 are illustrations of screenshots of a rendered date picker component using the desktop integration framework of FIG. 2 in various embodiments according to the present invention. In FIG. 20, date picker 2000 is displayed on or near cell 2010 when a user selects cell 2010 of a workbook of a spreadsheet application to provide the user with a ready means to enter date and time information into cell 2010. Date picker 2000 can be embodied as a native component of an application or a third party widget. One example of date picker 2000 can include a standard Windows Forms component, a part of the Microsoft .NET framework.

In this example, date picker 2000 only allows a user to select date information 2020 as displayed. Date picker 2000 may provide the user the opportunity to select either or both date and time information. When a user selects or otherwise interacts with date picker 2000, date information 2110 may be displayed or otherwise conveyed to the user as illustrated in FIG. 21 by being entered into the cell.

In general, there may be 3 ways in which an input date may appear, Form component, Input date column, and Model driven column with date attribute. In all cases, the runtime behavior is the same: when an end user selects a cell bound to an input date component, a small modeless dialog appears. The dialog may contain small calendar or other date and time information input control. The user can pick a date from the month currently displayed. The user can also navigate to other months (in the past and in the future) and then pick a date. A single click on a date closes the date picker dialog and updates the cell with that date. If the cell is empty (or contains any non-date value), the calendar may default to today. If the cell contains a valid date value, the calendar may default to that date.

Model-Driven List Picker

In various embodiments, methods, systems, and non-transitory computer-readable media are disclosed that allow developers to place model-driven list pickers as components of a document using a desktop integration framework. The model-driven list pickers can be tied to model metadata allowing a pick list to be dynamically generated using model data when the document is rendered. This allows workbook developers to leverage existing model layer metadata combined with simple workbook configuration to easily create powerful search and select user interfaces for choosing values cells.

In various embodiments, desktop integration framework 200 allows a developer to provide model-driven list pickers associated with elements of document 250 that enable a user interacting with application 230 to pick from a list of values. A model-driven list may include a search interface view that appears when a user's mouse is over the element or when the element is selected. Typically, workbook developers that want to display a list of choices to a user take one of two approaches. First, for lists with relatively few choices, a component is provided that establishes a drop-down choice list UI using native built-in validation list features. This component is usually targeted at lists with up to about 20 choices. There can be a maximum list of, for example, 250 choices allowed for performance reasons. Second, the developer can create a custom web page and display it from a component's double-click action set using a Dialog action. The custom web page is feasible but tedious. In practice, workbook developers avoid the development cost of the custom web pages.

In one aspect, a document designer may desire to include a model-driven list picker for given columns, rows, or cells of a spreadsheet application, such as Microsoft Excel. In another aspect, a document designer may desire to include a model-driven list picker for a particular form component or a menu command (such as a ribbon interface of Microsoft Office). ADF-DI client component 240 enables a document creator to easily specify a model-driven list picker property for attributes of a component inserted into document 250. The model-driven list picker property is defined during document creation separately and independently of any popup picking or list searching functionality natively provided by application 230. When document 250 is rendered at run time, ADF-DI client component 240 may provide one or more model-driven list picker dialogs that help a user search and enter information. Because the model-driven list picker is defined separately from document 250, list information that populates the picker may be dynamically obtained and search by ADF-DI client component 240 from a variety of sources, such as from a static mapping, a resource bundle, or model driven allowing a developer to associate source list data for model-driven list pickers with an attribute of a model.

Figure 22:
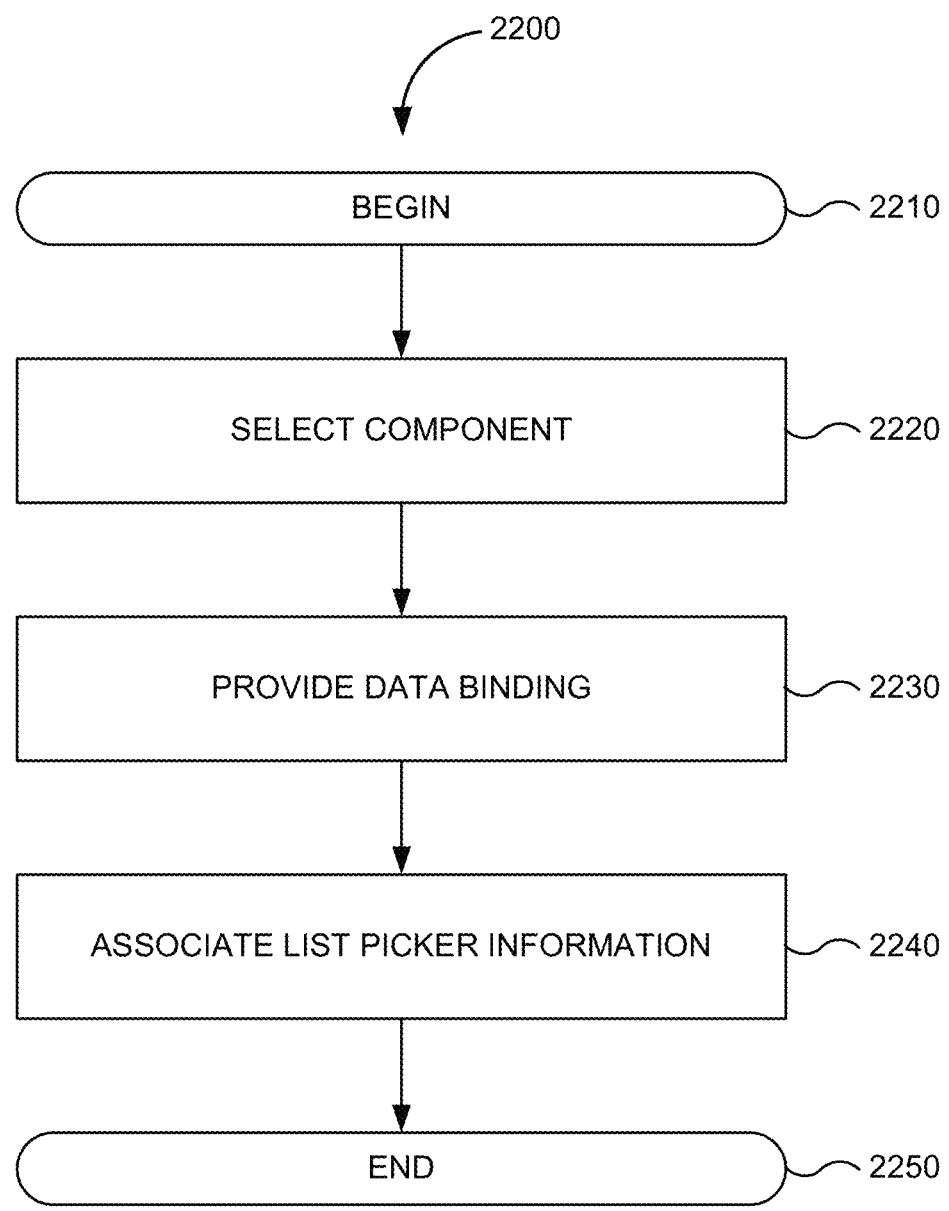
FIG. 22 is a flowchart of a method for designing a document using the desktop integration framework of FIG. 2 that includes a popup list picker in one embodiment according to the present invention.

FIG. 22 is a flowchart of method 2200 for designing a document using desktop integration framework 2200 of FIG. 22 to provide a model-driven list picker in spreadsheet software in one embodiment according to the present invention. Implementations of or processing in method 2200 depicted in FIG. 22 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 2200 depicted in FIG. 22 begins in step 2210.

In step 2220, a component is selected. As discussed, a document is created in an application that natively creates such documents or using a library that creates the document in a native format. According to FIG. 2, a user can open an existing document or create a new document in application 230, such as creating a new spreadsheet in Microsoft Excel. A document developer may edit, structure, or format the document in any desired manner using native and non-native tools. Furthermore, the developer may select from a list of pre-provided components or the developer may create one or more components to add to the document.

In step 2230, data binding is provided. The data binding includes information utilized by ADF-DI client component 240 to render contents of the document based on data obtained from application server 260. In one aspect, the document metadata identifies each component included in the document and how each component is bound to one or more objects in ADF model 280. Document metadata may further provide access information, static data, and other logic or data manipulation information provided by the developer.

In step 2240, a model-driven list picker is associated with the component. In various embodiments, ADF-DI client component 240 provides a model-driven list picker component or a component property for some or all components that may be added to document 250. In one aspect, when a component or column is created from a binding element, a model-driven list picker interface can be automatically set to a list of choices that are model-driven.

A model-driven component may include an action set property. If a column is bound to a list type attribute, the EnabledInputListOfValues property may be used to determine the behavior. If EnabledInputListOfValues is true, the action set of the component will launch the list picker.

In various embodiments, model-driven list pickers may be defined as components or on components rather than utilizing native search and selection aspects of application 230. In one aspect, document contents are rendered during document design to determine how one or more list pickers defined as or on one or more components behave. In one aspect, a test mode feature can allow document contents to be rendered to test one or more list pickers and when stopping the test mode, ADF-DI client component 240 returns to design-time. FIG. 22 ends in step 2250.

Accordingly, a document designer may include a model-driven list picker for given columns, rows, or cells of a spreadsheet application, such as Microsoft Excel. In another aspect, a document designer may desire to include model-driven list pickers for a particular form component or a menu command (such as a ribbon interface of Microsoft Office). ADF-DI client component 240 can provide a subcomponent selection UI that enables a document creator to easily include a model-driven list picker subcomponent for attributes of a component inserted into document 250. The model-driven list picker property is defined during document creation separately and independently of any popup or list functionality natively provided by application 230. When document 250 is rendered at run time, ADF-DI client component 240 may leverage native model-driven list picker functionality of application 230 or alternative model-driven list pickers to provide users with a list of selectable choices. Because selection choices for model-driven list pickers can be defined separately from document 250, list information may be dynamically obtained by ADF-DI client component 240 from a variety of sources, such as from a static mapping, a resource bundle, or model driven allowing a developer to associate a popup with an attribute of a model and source lists information from the model.

Figure 23:
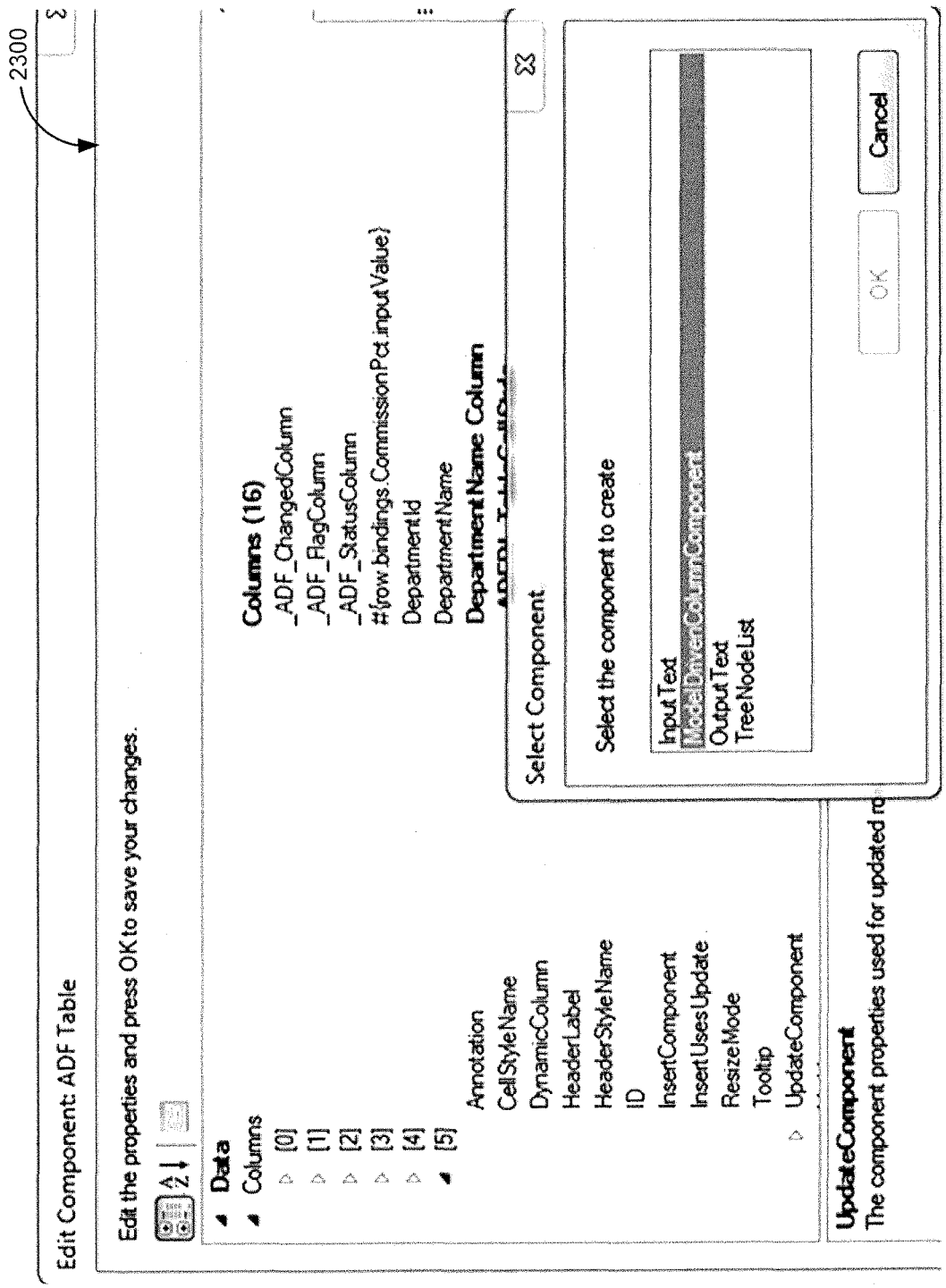
FIG. 23 is a screenshot of a set of document attributes that enable a user to define a list picker attribute in one embodiment according to the present invention.

FIG. 23 is an illustration of screenshot 2300 of a set of document attributes that enable a user to define a model-driven list picker attribute in one embodiment according to the present invention. In this example, a developer may require that all entries in column 5 "Department Name" of a data table be of a particular value. The developer allows end users to select from a list of values driven by a linked data model.

FIG. 24 is an illustration of screenshot 2400 of a property that enables a user to enable a model-driven list picker for a document element in one embodiment according to the present invention. In this example, the developer enables a property of the document to indicate that any values to be searched or presented to end users is driven from a linked data model.

Figure 25:
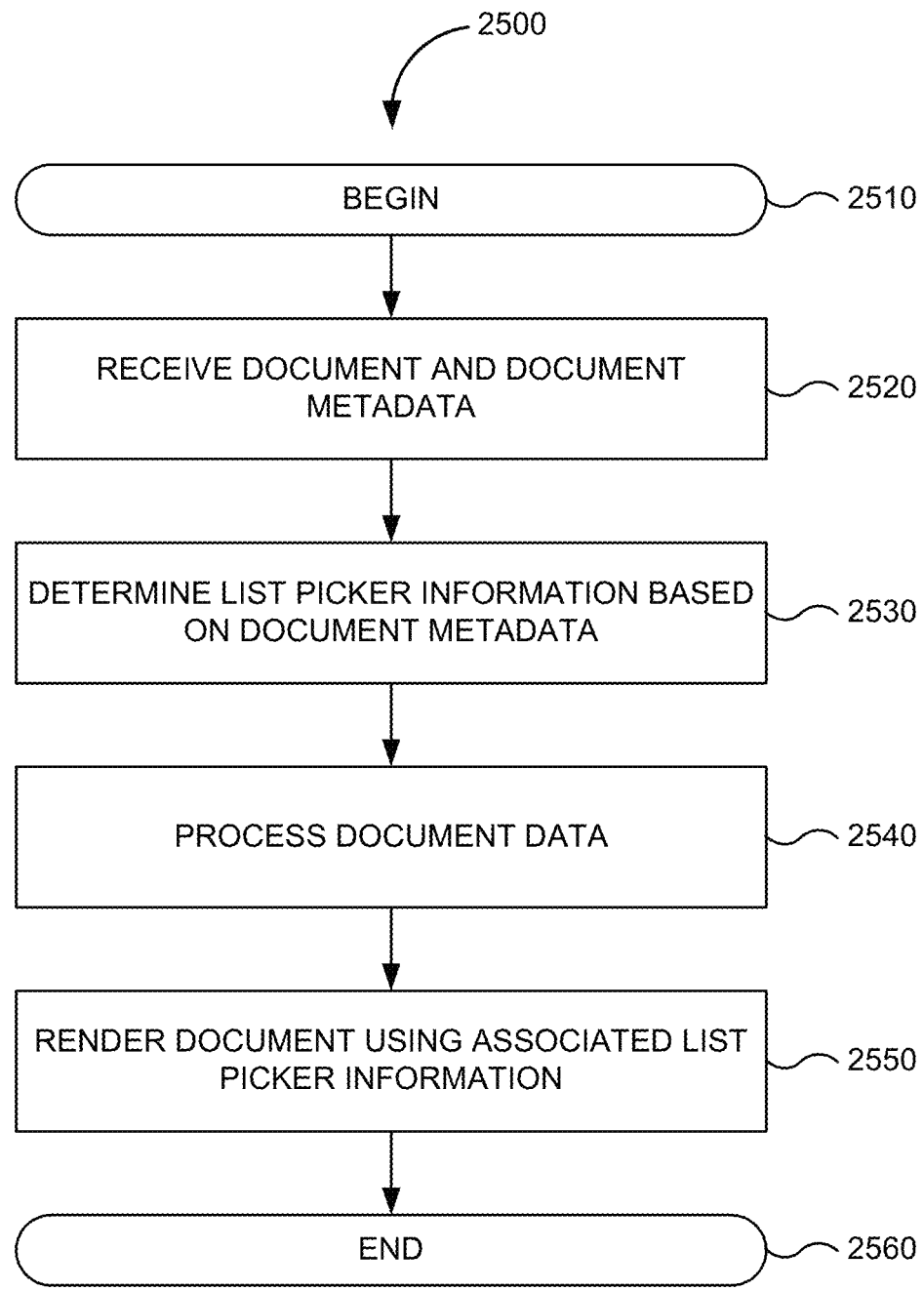
FIG. 25 is a flowchart of a method for interacting with a document using the desktop integration framework of FIG. 2 that includes one or more popup or list pickers in one embodiment according to the present invention.

FIG. 25 is a flowchart of method 2500 for interacting with a document using desktop integration framework 200 of FIG. 2 that includes one or more model-driven list pickers in one embodiment according to the present invention. Implementations of or processing in method 2500 depicted in FIG. 25 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 2500 depicted in FIG. 25 begins in step 2510.

In step 2520, a document and its corresponding metadata are received. According to FIG. 2, a user can interact with application server 260 to retrieve a desired document, such as by clicking a document link. The document and metadata may be downloaded or otherwise communicated to desktop 210 and opened in application 230.

In step 2530, model-driven list picker information is determined based on the document metadata. As discussed above, the document metadata includes information utilized by ADF-DI client component 240 to render contents of the document based on data obtained from application server 260. Accordingly, ADF-DI client component 240 determines which components are to be added to the document and where and what data is used by each component as well as applies any logic defined by a developer. ADF-DI client component 240 further determines whether any components have associated model-driven list picker information. In various aspects, model-driven list picker information is delivered separately from the published document. Model-driven list picker information may be transmitted with the actual data to be rendered as the contents of document 250.

In step 2540, document data is processed. As discussed above, published documents can be stored separately from the document metadata and the actual data used by the document. In general, the published document includes at least enough metadata that enables ADF-DI client component 240 to initialize the document and request additional information from ADF-DI server component 270 to render the contents of document 250 for the user.

In step 2550, the document is rendered using any associated model-driven list picker information. As discussed above, ADF-DI client component 240 may retrieve from or through from ADF-DI server component 270 data from ADF model 280 or other logic associated with document 250. ADF-DI client component 240 may further retrieve from or through from ADF-DI server component 270 any metadata that includes model-driven list picker information or other associated list selection information. Finally, ADF-DI client component 240 may then render contents of document 250 utilizing the associated model-driven list picker information.

In one embodiment, ADF-DI client component 240 renders model-driven list picker dialogs utilizing non-native or native features of application 230. For example, ADF-DI client component 240 may insert model-driven list pickers utilizing APIs or other functionality native to application 230. In another example, ADF-DI client component 240 may insert model-driven list pickers utilizing APIs or other functionality external to application 230. One or more transfer or translation mechanisms may be used to insert information obtained using external APIs into application 230, such as operating system clipboards and the like. FIG. 25 ends in step 2560.

Figure 26:
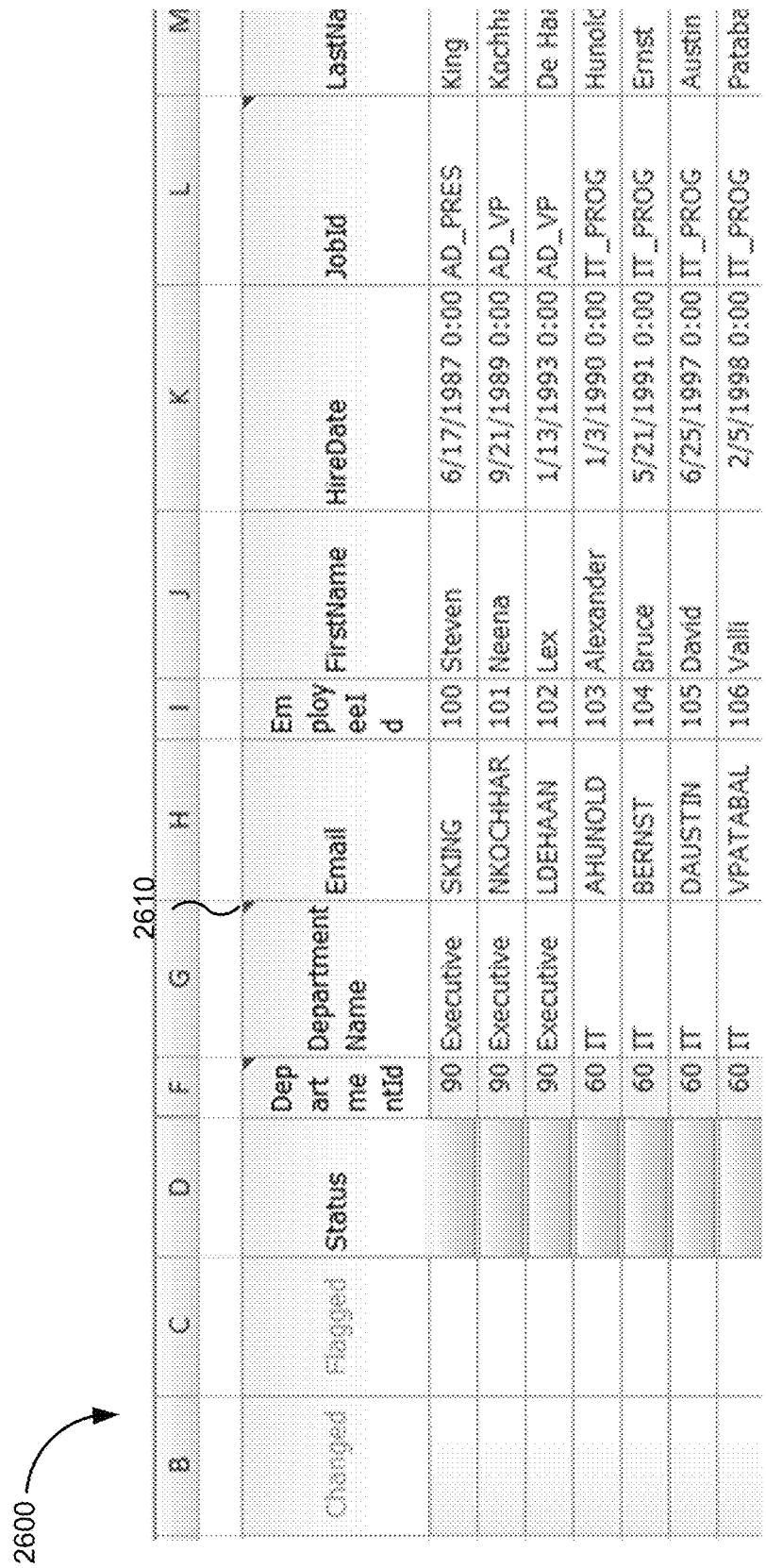
FIGS. 26 and 27 are screenshots of a popup or list picker defined using the desktop integration framework of FIG. 2 in one embodiment according to the present invention.
Figure 27:
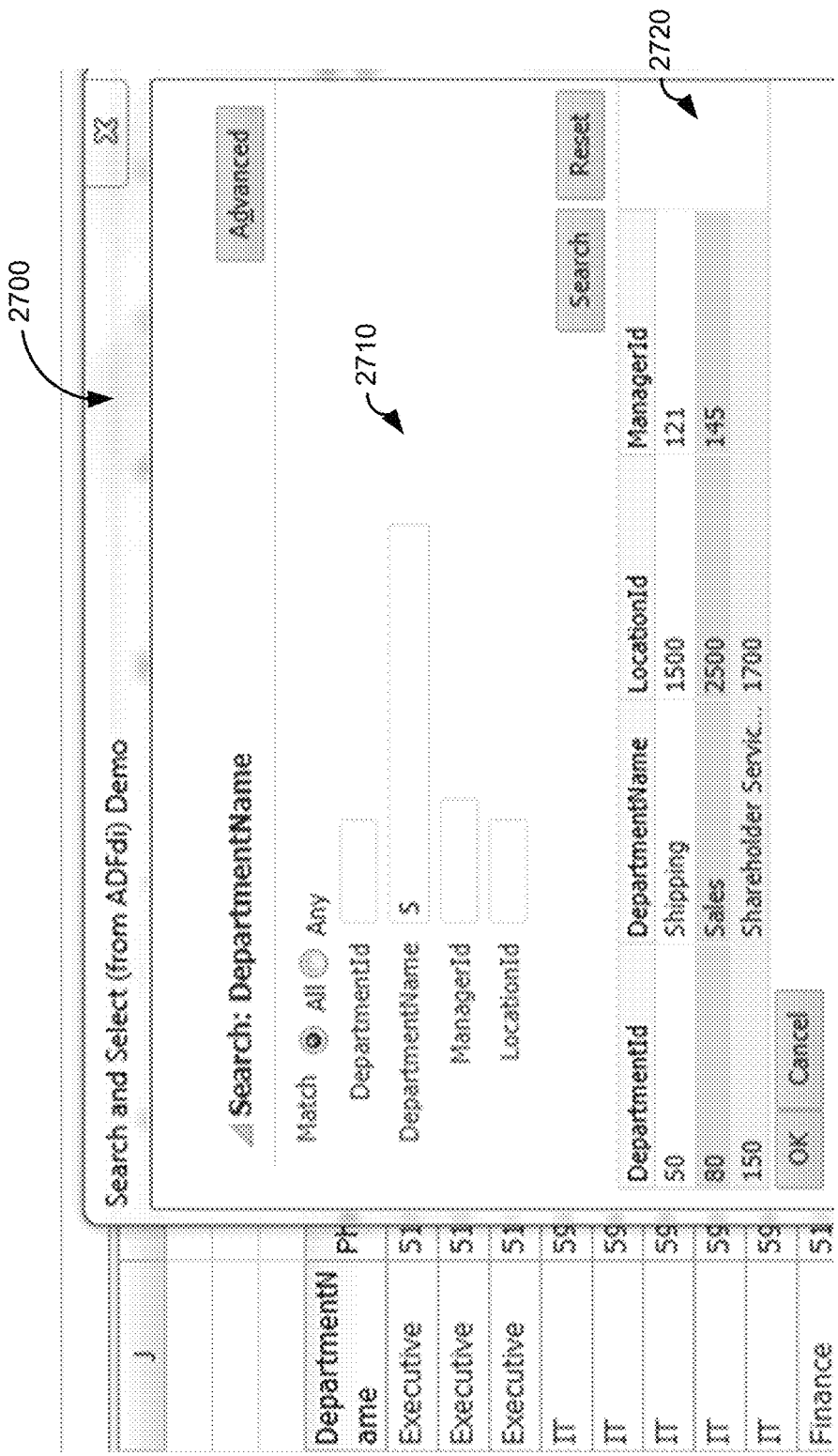

FIGS. 26 and 27 are illustrations of screenshots 26 and 27 of a model-driven list picker defined using the desktop integration framework 200 of FIG. 2 in one embodiment according to the present invention. In FIG. 26, table 2600 includes column 2610. One or more visual indicators may be placed on or near column 2610 to indicate that data validation conditions are in effect as a result of a developer associating model-driven list picker information with column 2610. When a user selects or otherwise interacts with a cell in column 2610, one or more model-driven list pickers are displayed or otherwise conveyed to the user.

When a user selects or otherwise interacts with a portion of a document associated with a model-driven list picker, picker 2700 may be displayed or otherwise conveyed to the user as illustrated in FIG. 27. In this example, search interface 2710 allows the user to search for a desired value to be inserted in the document. Results interface 2720 provides a list of results that match one or more conditions specified in search interface 2710. Results interface 2720 may further provide a list of all values from which a user may select. Accordingly, a user may select from a preconfigured list of values, a dynamically generated list of values driven by a data model, a pre-generated list of search results, as well as a dynamically generated list of search results.

In this example, search interface 2710 is modal such that it must be closed via the OK or Cancel button. The end-user may resize the dialog using standard Windows UI gestures (e.g. grabbing the border and dragging). The initial position of search interface 2710 may be close to a launching cell, leaving the launching cell visible (if possible). The title of search interface 2710 may be derived from an attribute label. The content area of search interface 2710 shows one or more UI elements. For example, when a picker dialog first opens, a search form is visible.

An end user may type/paste a desired value directly into a worksheet cell bound to a ModelDrivenColumn component. In this case, a picker does not appear. No web app session is needed for this manual entry case. Alternatively, a picker dialog may require a valid user session. If no session exists when a picker is invoked, a login sequence may be triggered. For web applications that enforce authentication, a Login dialog appears. After the user successfully logs in, the picker dialog appears. However, if the end user does not successfully establish a session (e.g. they cancel out of the login dialog), then the picker dialog does not appear and there are no changes to the launching cell.

This feature provides a simple and easy approach for workbook developers to present a standard search/select UI via a picker dialog to their end-users. Developers that wish to provide a custom search/select UI may use the existing popup Dialog action feature.

CONCLUSION

Systems depicted in some of the figures may be provided in various configurations. In some embodiments, the systems may be configured as a distributed system where one or more components of the system are distributed across one or more networks in a cloud computing system.

Figure 28:
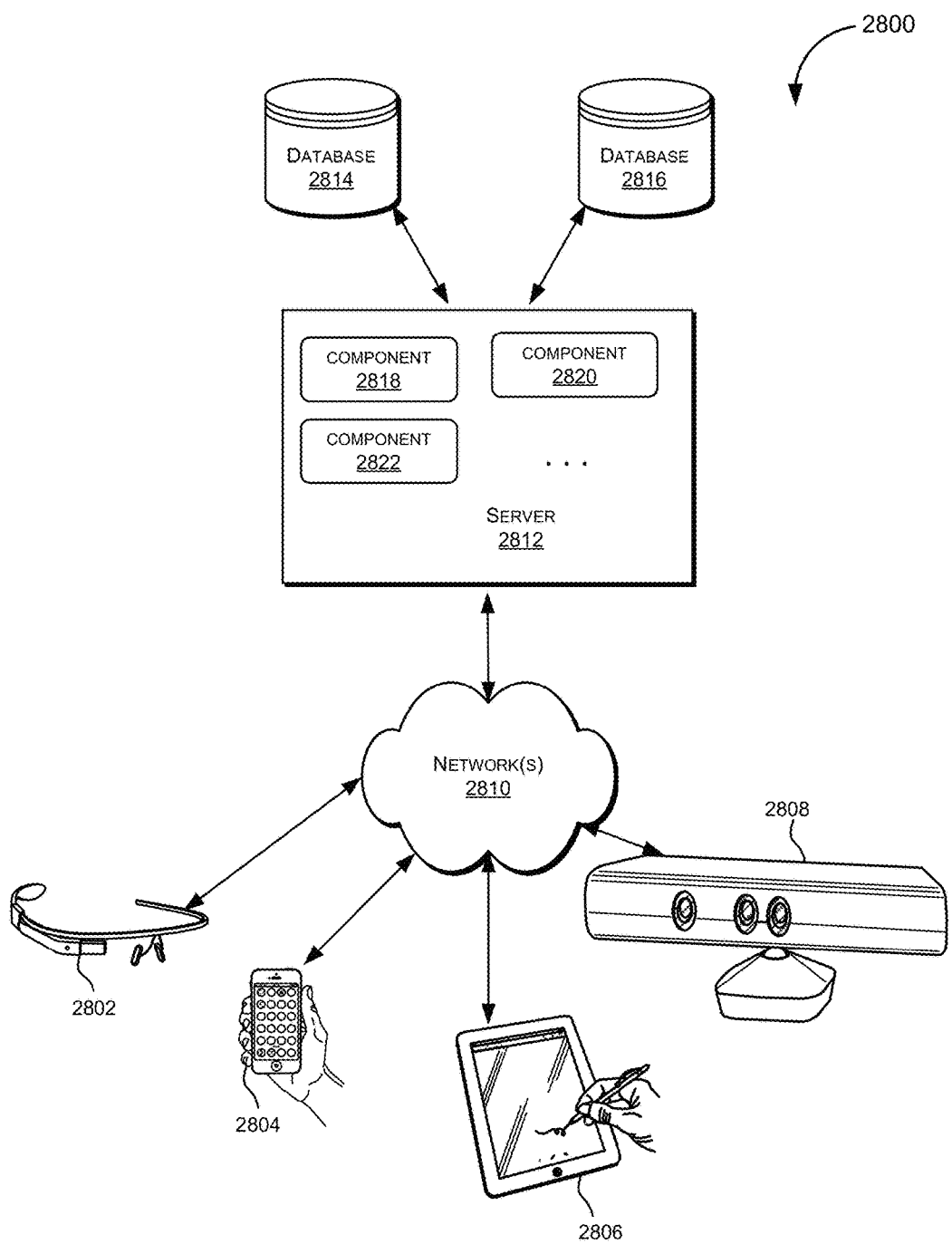
FIG. 28 depicts a simplified diagram of a distributed system for implementing one of the embodiments.

FIG. 28 depicts a simplified diagram of a distributed system 2800 for implementing one of the embodiments. In the illustrated embodiment, distributed system 2800 includes one or more client computing devices 2802, 2804, 2806, and 2808, which are configured to execute and operate a client application such as a web browser, proprietary client (e.g., Oracle Forms), or the like over one or more network(s) 2810. Server 2812 may be communicatively coupled with remote client computing devices 2802, 2804, 2806, and 2808 via network 2810.

In various embodiments, server 2812 may be adapted to run one or more services or software applications provided by one or more of the components of the system. In some embodiments, these services may be offered as web-based or cloud services or under a Software as a Service (SaaS) model to the users of client computing devices 2802, 2804, 2806, and/or 2808. Users operating client computing devices 2802, 2804, 2806, and/or 2808 may in turn utilize one or more client applications to interact with server 2812 to utilize the services provided by these components.

In the configuration depicted in the figure, the software components 2818, 2820 and 2822 of system 2800 are shown as being implemented on server 2812. In other embodiments, one or more of the components of system 2800 and/or the services provided by these components may also be implemented by one or more of the client computing devices 2802, 2804, 2806, and/or 2808. Users operating the client computing devices may then utilize one or more client applications to use the services provided by these components. These components may be implemented in hardware, firmware, software, or combinations thereof. It should be appreciated that various different system configurations are possible, which may be different from distributed system 2800. The embodiment shown in the figure is thus one example of a distributed system for implementing an embodiment system and is not intended to be limiting.

Client computing devices 2802, 2804, 2806, and/or 2808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2802, 2804, 2806, and 2808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2810.

Although exemplary distributed system 2800 is shown with four client computing devices, any number of client computing devices may be supported. Other devices, such as devices with sensors, etc., may interact with server 2812.

Network(s) 2810 in distributed system 2800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2810 can be a local area network (LAN), such as one based on Ethernet, Token-Ring and/or the like. Network(s) 2810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2812 may be adapted to run one or more services or software applications described in the foregoing disclosure. For example, server 2812 may correspond to a server for performing processing described above according to an embodiment of the present disclosure.

Server 2812 may run an operating system including any of those discussed above, as well as any commercially available server operating system. Server 2812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2812 may include one or more applications to analyze and consolidate data feeds and/or event updates received from users of client computing devices 2802, 2804, 2806, and 2808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2812 may also include one or more applications to display the data feeds and/or real-time events via one or more display devices of client computing devices 2802, 2804, 2806, and 2808.

Distributed system 2800 may also include one or more databases 2814 and 2816. Databases 2814 and 2816 may reside in a variety of locations. By way of example, one or more of databases 2814 and 2816 may reside on a non-transitory storage medium local to (and/or resident in) server 2812. Alternatively, databases 2814 and 2816 may be remote from server 2812 and in communication with server 2812 via a network-based or dedicated connection. In one set of embodiments, databases 2814 and 2816 may reside in a storage-area network (SAN). Similarly, any necessary files for performing the functions attributed to server 2812 may be stored locally on server 2812 and/or remotely, as appropriate. In one set of embodiments, databases 2814 and 2816 may include relational databases, such as databases provided by Oracle, that are adapted to store, update, and retrieve data in response to SQL-formatted commands.

FIG. 29 illustrates an exemplary computer system 2900, in which various embodiments of the present invention may be implemented. The system 2900 may be used to implement any of the computer systems described above. As shown in the figure, computer system 2900 includes a processing unit 2904 that communicates with a number of peripheral subsystems via a bus subsystem 2902. These peripheral subsystems may include a processing acceleration unit 2906, an I/O subsystem 2908, a storage subsystem 2918 and a communications subsystem 2924. Storage subsystem 2918 includes tangible computer-readable storage media 2922 and a system memory 2910.

Bus subsystem 2902 provides a mechanism for letting the various components and subsystems of computer system 2900 communicate with each other as intended. Although bus subsystem 2902 is shown schematically as a single bus, alternative embodiments of the bus subsystem may utilize multiple buses. Bus subsystem 2902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2904, which can be implemented as one or more integrated circuits (e.g., a conventional microprocessor or microcontroller), controls the operation of computer system 2900. One or more processors may be included in processing unit 2904. These processors may include single core or multicore processors. In certain embodiments, processing unit 2904 may be implemented as one or more independent processing units 2932 and/or 2934 with single or multicore processors included in each processing unit. In other embodiments, processing unit 2904 may also be implemented as a quad-core processing unit formed by integrating two dual-core processors into a single chip.

In various embodiments, processing unit 2904 can execute a variety of programs in response to program code and can maintain multiple concurrently executing programs or processes. At any given time, some or all of the program code to be executed can be resident in processor(s) 2904 and/or in storage subsystem 2918. Through suitable programming, processor(s) 2904 can provide various functionalities described above. Computer system 2900 may additionally include a processing acceleration unit 2906, which can include a digital signal processor (DSP), a special-purpose processor, and/or the like.

I/O subsystem 2908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2900 may comprise a storage subsystem 2918 that comprises software elements, shown as being currently located within a system memory 2910. System memory 2910 may store program instructions that are loadable and executable on processing unit 2904, as well as data generated during the execution of these programs.

Depending on the configuration and type of computer system 2900, system memory 2910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2904. In some implementations, system memory 2910 may include multiple different types of memory, such as static random access memory (SRAM) or dynamic random access memory (DRAM). In some implementations, a basic input/output system (BIOS), containing the basic routines that help to transfer information between elements within computer system 2900, such as during start-up, may typically be stored in the ROM. By way of example, and not limitation, system memory 2910 also illustrates application programs 2912, which may include client applications, Web browsers, mid-tier applications, relational database management systems (RDBMS), etc., program data 2914, and an operating system 2916. By way of example, operating system 2916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2918 may also provide a tangible computer-readable storage medium for storing the basic programming and data constructs that provide the functionality of some embodiments. Software (programs, code modules, instructions) that when executed by a processor provide the functionality described above may be stored in storage subsystem 2918. These software modules or instructions may be executed by processing unit 2904. Storage subsystem 2918 may also provide a repository for storing data used in accordance with the present invention.

Storage subsystem 2900 may also include a computer-readable storage media reader 2920 that can further be connected to computer-readable storage media 2922. Together and, optionally, in combination with system memory 2910, computer-readable storage media 2922 may comprehensively represent remote, local, fixed, and/or removable storage devices plus storage media for temporarily and/or more permanently containing, storing, transmitting, and retrieving computer-readable information.

Computer-readable storage media 2922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2900.

By way of example, computer-readable storage media 2922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2922 may include, but is not limited to, Zip® drives, flash memory cards, universal serial bus (USB) flash drives, secure digital (SD) cards, DVD disks, digital video tape, and the like. Computer-readable storage media 2922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2900.

Communications subsystem 2924 provides an interface to other computer systems and networks. Communications subsystem 2924 serves as an interface for receiving data from and transmitting data to other systems from computer system 2900. For example, communications subsystem 2924 may enable computer system 2900 to connect to one or more devices via the Internet. In some embodiments communications subsystem 2924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2924 can provide wired network connectivity (e.g., Ethernet) in addition to or instead of a wireless interface.

In some embodiments, communications subsystem 2924 may also receive input communication in the form of structured and/or unstructured data feeds 2926, event streams 2928, event updates 2930, and the like on behalf of one or more users who may use computer system 2900.

By way of example, communications subsystem 2924 may be configured to receive data feeds 2926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2924 may also be configured to receive data in the form of continuous data streams, which may include event streams 2928 of real-time events and/or event updates 2930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2924 may also be configured to output the structured and/or unstructured data feeds 2926, event streams 2928, event updates 2930, and the like to one or more databases that may be in communication with one or more streaming data source computers coupled to computer system 2900.

Computer system 2900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A non-transitory computer-readable medium storing code that when executed by one or more processors associated with one or more computer systems configures the one or more processors for creating documents of desktop applications that act as user interfaces for web-based applications, the non-transitory computer-readable medium comprising:
   code for creating contents of a document in a native application format associated with an application that includes or is in communication with a view layer and a controller layer developed via an application development framework;
   code for associating a user interface element with a portion of the contents of the document using the view layer and the controller layer, wherein the user interface element and the portion of the contents are components of the application development framework and the portion of the contents of the document is linked with data associated with data models of a web-based application in communication with a model layer developed via the application development framework;
   code for mapping the user interface element to one or more of the data models of the web-based application using the view layer and the controller layer, wherein the model layer exposes the data models to the view layer and controller layer such that the user interface element contributes a list picker comprising at least a portion of the data associated with the one or more data models of the web-based application to a user interface within the application;

code for generating metadata associated with the document based on the associating of the user interface element with the portion of the contents of the document and the mapping of the user interface element to the one or more data models of the web-based application;

code for retrieving the document from the web-based application, the document comprising metadata that allows the view layer and the controller layer to initialize the document in the application and request the portion of data associated with the one or more data models from the model layer; and code for rendering the list picker in the user interface within the document at runtime based on the document, the metadata associated with the document, and the portion of data associated with the one or more data models.

2. The non-transitory computer-readable medium of claim 1 wherein the code for mapping the user interface element to the one or more data models provided by the web-based application comprises code for configuring the user interface element to provide the list picker based on a type of the data determined at runtime.

3. The non-transitory computer-readable medium of claim 1 wherein the code for mapping the user interface element to the one or more data models provided by the web-based application comprises code for configuring the user interface element with specific functionality allowing the user to interact with the data based on one or more aspects of the data determined at runtime.

4. The non-transitory computer-readable medium of claim 1 wherein the code for mapping the user interface element to the one or more data models provided by the web-based application comprises code for configuring the user interface element to provide a list of values derived from an entity modeled by the one or more data models at runtime.

5. The non-transitory computer-readable medium of claim 1 wherein the code for mapping the user interface element to the one or more data models provided by the web-based application comprises code for configuring the user interface element to provide a search interface enabling a user to search within a list of values derived from an entity modeled by the one or more data models at runtime.

6. The non-transitory computer-readable medium of claim 1 wherein the code for associating the user interface element with the portion of the contents of the document comprises code for associating a text box, label, button, list, table, radio button, checkbox, input widget, or output widget.

7. The non-transitory computer-readable medium of claim 1 wherein the code for creating the contents of the document in the native application format associated with the application comprises code for creating a spreadsheet using a spreadsheet desktop application.

8. The non-transitory computer-readable medium of claim 1 wherein the code for creating the contents of the document in the native application format associated with the application comprises code for creating a word processing document using a desktop publishing application.

9. The non-transitory computer-readable medium of claim 1 further comprising:
code for publishing the document and the metadata associated with the document to the web-based application such that the document becomes usable as the user interface to the web-based application.

10. The non-transitory computer-readable medium of claim 1 wherein the code for rendering the document comprises code for generating functionality that displays the user interface in response to a user interaction that allows a user to select one or more values determined at runtime and that inputs a selection into the contents of the document.

11. The non-transitory computer-readable medium of claim 1 further comprising:
code for receiving a modification to the document in the portion of data contributed by the user interface element; and
code for updating the web-based application using the application development framework to reflect the modification.

12. A method comprising:
creating, by a computer system, contents of a document in a native application format associated with application that includes or is in communication with a view layer and a controller layer developed via an application development framework;

associating, by a computer system, a user interface element with a portion of the contents of the document using the view layer and the controller layer, wherein the user interface element and the portion of the contents are components of the application development framework and the portion of the contents of the document is linked with data associated with data models of a web-based application in communication with a model layer developed via the application development framework;

mapping, by a computer system, the user interface element to one or more of the data models of the web-based application using the view layer and the controller layer, wherein the model layer exposes the data models to the view layer and controller layer such that the user interface element contributes a list picker comprising at least a portion of data associated with the one or more data models of the web-based application to a user interface within the application;

generating, by a computer system, metadata associated with the document based on the associating of the user interface element with the portion of the contents of the document and the mapping of the user interface element to the one or more data models of the web-based application;

retrieving, by a computer system, the document from the web-based application, the document comprising metadata that allows the view layer and the controller layer to initialize the document in the first application and request the portion of data associated with the one or more data models from the model layer; and rendering, by a computer system, the list picker in the user interface within the document at runtime based on the document, the metadata associated with the document, and the portion of data associated with the one or more data models.

13. A system comprising:
a processor; and
a memory storing a set of instructions which when executed by the processor configure the processor to:
create contents of a document in a native application format associated with an application that includes or is in communication with a view layer and a controller layer developed via an application development framework;
associate a user interface element with a portion of the contents of the document using the view layer and the controller layer, wherein the user interface element and the portion of the contents are components of the application development framework and the portion of the contents of the document is linked with data associated with data models of a web-based application in communication with a model layer developed via the application development framework;

map the user interface element to one or more of the data models of the web-based application using the view layer and the controller layer, wherein the model layer exposes the data models to the view layer and controller layer such that the user interface element contribute a list picker comprising at least a portion of data associated with the one or more data models of the web-based application to a user interface within the application;

generate metadata associated with the document based on the associating of the user interface element with the portion of the contents of the document and the mapping of the user interface element to the one or more data models of the web-based application;

retrieve the document from the web-based application, the document comprising metadata that allows the view layer and the controller layer to initialize the document in the application and request the portion of data associated with the one or more data models from the model layer, wherein the view layer and controller layer reside within the application on a client computing device and the model layer resides on a remote server configured to host the web-based application; and render the list picker in the user interface within the document at runtime based on the document, the metadata associated with the document, and the portion of data associated with the one or more data models.

* * * * *

UNITED STATES PATENT AND TRADEMARK OFFICE
CERTIFICATE OF CORRECTION

| | |
|---|---|
| PATENT NO. | : 9,619,453 B2 |
| APPLICATION NO. | : 14/333205 |
| DATED | : April 11, 2017 |
| INVENTOR(S) | : Logan et al. |

Page 1 of 1

It is certified that error appears in the above-identified patent and that said Letters Patent is hereby corrected as shown below:

In the Specification

In Column 25, Line 19, after "AutoFitAllWithHeader" insert -- . --.

In Column 25, Line 26, after "text" insert -- . --.

In Column 25, Line 31, after "UseColumnValue" insert -- . --.

In Column 25, Line 39, after "Table"" insert -- . --.

In the Claims

In Column 42, Line 49, in Claim 12, before "application" delete "first".

Signed and Sealed this
Nineteenth Day of September, 2017

Joseph Matal
*Performing the Functions and Duties of the
Under Secretary of Commerce for Intellectual Property and
Director of the United States Patent and Trademark Office*